US012798875B2

(12) United States Patent
Kosugi et al.

(10) Patent No.: US 12,798,875 B2
(45) Date of Patent: Nov. 17, 2026

(54) AUTOMATED WAREHOUSE

(71) Applicant: Daifuku Co., Ltd., Osaka (JP)

(72) Inventors: Yuki Kosugi, Hinocho (JP); Yasunobu Matsuo, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 330 days.

(21) Appl. No.: 18/743,935

(22) Filed: Jun. 14, 2024

(65) Prior Publication Data

US 2024/0417166 A1 Dec. 19, 2024

(30) Foreign Application Priority Data

Jun. 16, 2023 (JP) ................................ 2023-099360

(51) Int. Cl.
*B65G 1/04* (2006.01)
*B65G 1/10* (2006.01)

(52) U.S. Cl.
CPC ............. *B65G 1/0407* (2013.01); *B65G 1/10* (2013.01); *B65G 2207/40* (2013.01)

(58) Field of Classification Search
CPC . B65G 1/0407; B65G 1/0428; B65G 2207/40
See application file for complete search history.

(56) References Cited

U.S. PATENT DOCUMENTS 3,954,185 A * 5/1976 Wentz ....................... B66F 9/07 414/286
4,466,765 A * 8/1984 Mautino .............. B65G 1/0407 414/331.14
4,787,804 A * 11/1988 Edenas ..................... B66F 9/07 414/254
5,015,140 A * 5/1991 Kling .................. B65G 1/0407 414/282

(Continued)

FOREIGN PATENT DOCUMENTS

JP 2007246231 A 9/2007
WO WO-2023115089 A1 * 6/2023 ............... E06C 9/06

OTHER PUBLICATIONS

WO 2023/115089 A1 (Hadzic) Jun. 29, 2023 (English language machine translation). [online] [retrieved Jul. 6, 2026]. Retrieved from: Espacenet. (Year: 2023).*

*Primary Examiner* — Jonathan Snelting
(74) *Attorney, Agent, or Firm* — The Webb Law Firm

(57) ABSTRACT

An automated warehouse includes a storage shelf, a stacker crane, and a maintenance facility. The maintenance facility includes a work stage. The work stage includes a mast penetration portion, a stage scaffold, and a support frame configured to support the stage scaffold. The stage scaffold includes a fixed scaffold fixed to the support frame, and a movable scaffold. The movable scaffold is changeable between a first retracting posture in which the movable scaffold does not come into contact with the path of the mast and which does not allow the movable scaffold to function as a scaffold for the operator and a first deployment posture in which the movable scaffold comes into contact with the path of the mast but does not come into contact with the mast of the stacker crane at a maintenance position and which allows the movable scaffold to function as the scaffold for the operator.

8 Claims, 11 Drawing Sheets

(56) References Cited

U.S. PATENT DOCUMENTS

| | | | | | |
|---|---|---|---|---|---|
| 5,397,211 | A * | 3/1995 | Lloyd | B66F 9/141 | |
| | | | | 104/246 | |
| 7,787,985 | B2 * | 8/2010 | Tsujimoto | B65G 1/0407 | |
| | | | | 700/214 | |
| 9,738,448 | B1 * | 8/2017 | Yamagishi | B65G 1/0435 | |
| 10,294,026 | B1 * | 5/2019 | Lee | B65G 1/0492 | |
| 10,773,887 | B2 * | 9/2020 | Omori | B65G 1/0407 | |

* cited by examiner

AUTOMATED WAREHOUSE

CROSS-REFERENCE TO RELATED APPLICATION

This application claims priority to Japanese Patent Application No. 2023-099360 filed Jun. 16, 2023, the disclosure of which is hereby incorporated by reference in its entirety.

BACKGROUND OF THE INVENTION

1. Field of the Invention

The present invention relates to an automated warehouse including a storage shelf configured to store a plurality of articles, a stacker crane configured to transport the articles, and a maintenance facility configured to perform maintenance of the stacker crane.

2. Description of Related Art

For example, Japanese Unexamined Patent Application Publication No. 2007-246231 (Patent Literature 1) discloses a technology related to an automated warehouse. Hereinafter, reference signs described within parentheses in the Description of the Related Art are reference signs used in Patent Literature 1.

An automated warehouse in Patent Literature 1 includes a storage shelf (a storage rack row 2A) for storing a plurality of articles, a stacker crane (a stacker crane C1) configured to transport the articles to the storage shelf, and a standby zone(S). The stacker crane is guided by a traveling rail (R1) laid along the storage shelf and travels. The stacker crane is also configured to be movable to the standby zone(S) adjacent to the storage shelf. The standby zone includes a stationing area (S1) where a spare stacker crane stands by, and a maintenance zone (S2) where repair and inspection are performed on the stacker crane. In this automated warehouse, when the stacker crane transporting the articles has a failure, the stacker crane having the failure is moved to the maintenance zone (S2).

Then, the spare stacker crane standing by in the stationing area (S1) is used to continue transporting the articles.

In the automated warehouse in Patent Literature 1, a maintenance operation is performed on a stacker crane having a failure or a stacker crane targeted for periodic inspection in the maintenance zone.

In order to deal with repair, maintenance, or the like on a relatively high position of the stacker crane in the maintenance operation, a maintenance facility including a scaffold above a floor face may be provided in some cases. Hereby, an operator can perform the maintenance operation on the stacker crane by use of the scaffold. In such a maintenance facility, it is desirable that the scaffold be provided at a position near the stacker crane so as to increase workability to each portion of the stacker crane. However, in a case where the scaffold is provided at the position near the stacker crane, the scaffold may come into contact with the stacker crane at the time when the stacker crane is stored in the maintenance facility.

SUMMARY OF THE INVENTION

In view of the foregoing, an automated warehouse including a maintenance facility which can store a stacker crane appropriately and which allows an operator to easily perform a maintenance operation on the stacker crane is desired.

An automated warehouse according to this disclosure is an automated warehouse including: a storage shelf configured to store a plurality of articles; a stacker crane configured to transport the articles; and a maintenance facility in which maintenance of the stacker crane is performed. The stacker crane includes: a travel wagon configured to travel along a travel path set along the storage shelf; a mast provided on the travel wagon in such a manner as to stand along an up-down direction; and a lifting and lowering body configured to support a transfer device for holding and transferring the articles and to lift and lower along the mast. The maintenance facility is disposed at a position not overlapping with the storage shelf as viewed vertically and being configured to store at least part of the stacker crane while the stacker crane is at a maintenance position set on the travel path. The maintenance facility includes a work stage disposed above the travel wagon. The work stage includes: a mast penetration portion through which the mast of the stacker crane at the maintenance position passes in the up-down direction; at least one stage scaffold provided in a region other than the mast penetration portion; and a support frame configured to support the at least one stage scaffold. The at least one stage scaffold includes at least one fixed scaffold fixed to the support frame, and a movable scaffold. The movable scaffold is changeable between a first retracting posture and a first deployment posture. The first retracting posture is a posture in which the movable scaffold does not come into contact with a path of the mast to move when the travel wagon travels along the travel path and which does not allow the movable scaffold to function as a scaffold for an operator. The first deployment posture is a posture in which the movable scaffold comes into contact with the path of the mast but does not come into contact with the mast of the stacker crane at the maintenance position and which allows the movable scaffold to function as the scaffold for the operator.

This configuration can prevent the maintenance facility from disturbing the movement of the stacker crane in a case where the stacker crane is moved along the travel path between the maintenance position and other positions. This makes it possible to appropriately store the stacker crane in the maintenance facility or take the stacker crane out of the maintenance facility.

With this configuration, when the movable scaffold is changed to the first deployment posture, it is possible to expand a range where the operator who performs the maintenance operation is movable and to provide the stage scaffold at a position near the mast of the stacker crane at the maintenance position. This allows the operator to easily perform the maintenance operation.

As such, with this configuration, it is possible to store the stacker crane appropriately and to allow the operator to easily perform the maintenance operation on the stacker crane.

Further features and advantages of the automated warehouse are made clear from the following description on exemplary and nonlimiting embodiments to be described with reference to the drawings.

DESCRIPTION OF THE INVENTION

Figure 1:
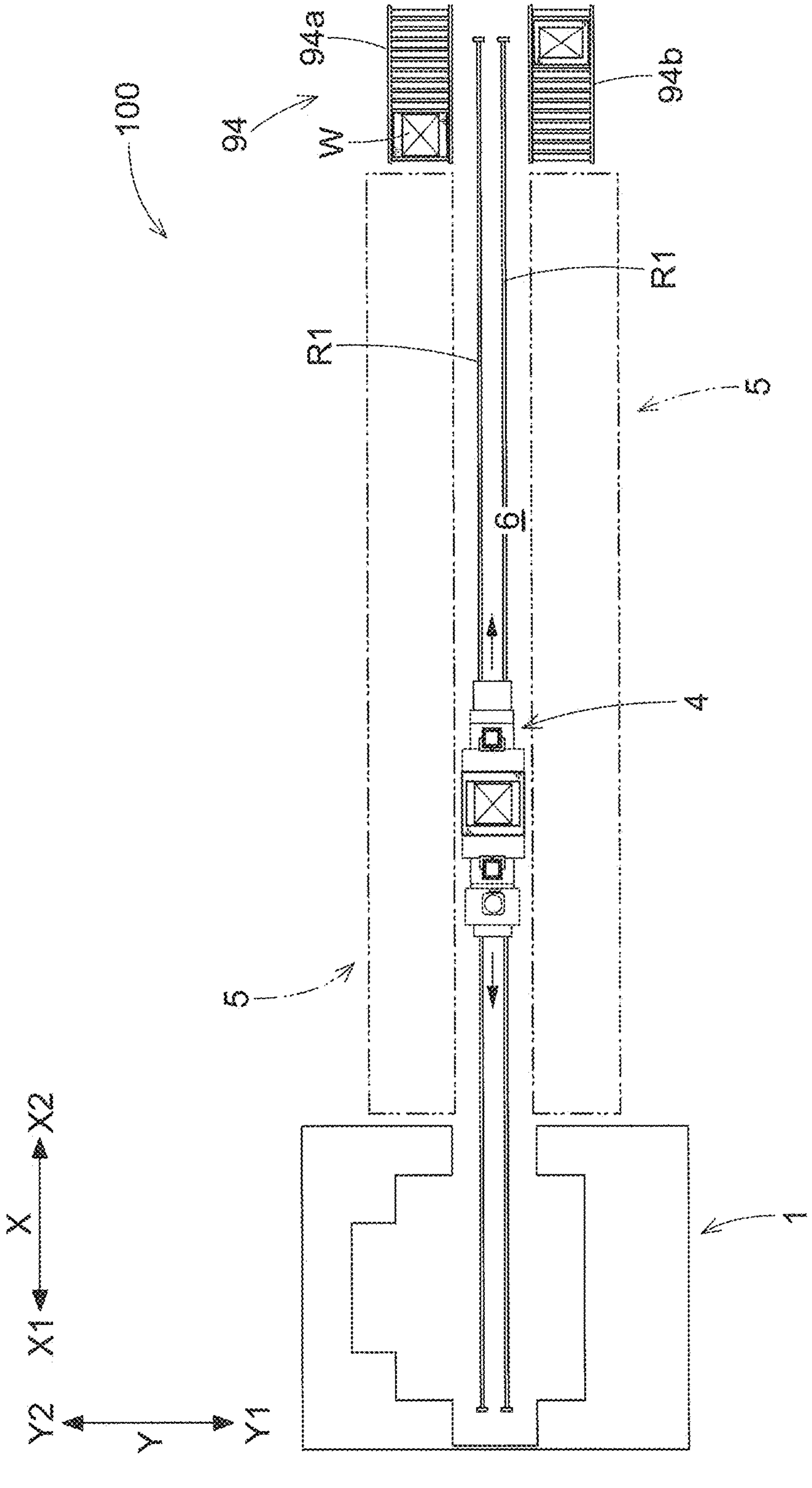
FIG. 1 is a plan view of an automated warehouse.

The following will describe an embodiment of an automated warehouse with reference to the drawings. As illustrated in FIG. 1, an automated warehouse 100 includes a storage shelf 5 configured to store a plurality of articles W, a stacker crane 4 configured to transport the articles W, and a maintenance facility 1 in which maintenance of the stacker crane 4 is performed. In the present embodiment, the storage shelf 5 and the maintenance facility 1 are disposed adjacent to each other. The automated warehouse 100 also includes a travel path 6 for the stacker crane 4 along the storage shelf 5 and the maintenance facility 1.

In the following description, a path direction X indicates a direction along the travel path 6 as viewed vertically, and a path perpendicular direction Y indicates a direction perpendicular to the path direction X as viewed vertically. A first side X1 in the path direction indicates one side in the path direction X, and its opposite side is referred to as a second side X2 in the path direction. Further, a first side Y1 in the path perpendicular direction indicates one side in the path perpendicular direction Y, and its opposite side is referred to as a second side Y2 in the path perpendicular direction. In the present example, the automated warehouse 100 further includes an inbound and outbound conveyor 94. As illustrated in FIG. 1, the maintenance facility 1 is disposed on the first side X1 in the path direction relative to the storage shelf 5, and the storage shelf 5 is disposed on the first side X1 in the path direction relative to the inbound and outbound conveyor 94.

In the example of FIG. 1, a pair of storage shelves 5 is disposed such that the storage shelves 5 are on the opposite outer sides of the travel path 6 in the path perpendicular direction Y. The inbound and outbound conveyor 94 includes an outbound conveyor **94*a* and an inbound conveyor 94*b*, and these conveyors are disposed along the path direction X and face each other across the travel path 6. The stacker crane 4 moves on the travel path 6 and transports the article W between the inbound and outbound conveyor 94 and the pair of storage shelves 5. In the present example, the storage shelf 5** includes a plurality of storage sections (not illustrated) arranged in the path direction X and in the up-down direction. Each of the plurality of storage sections is configured to store the article W.

Figure 2:
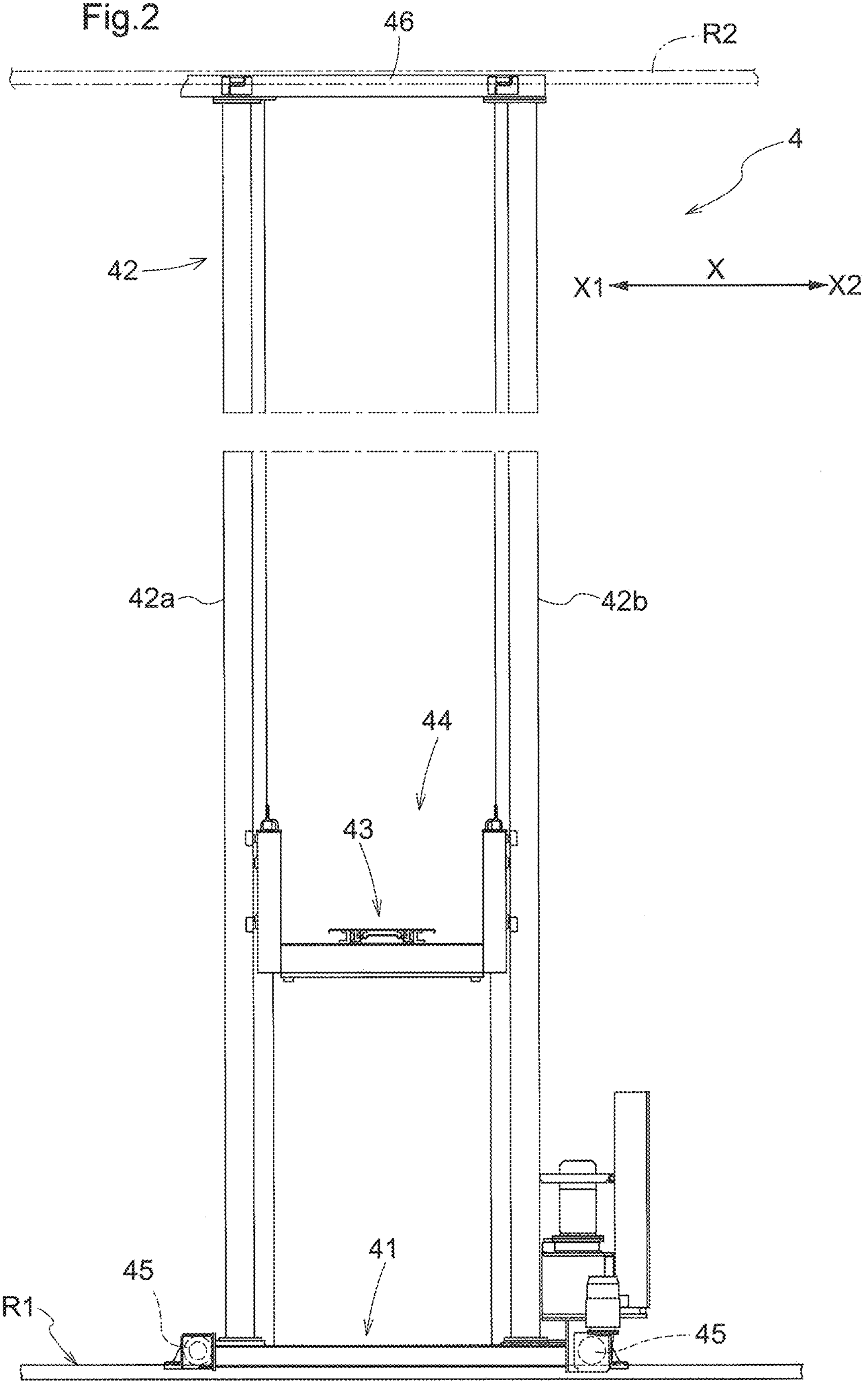
FIG. 2 is a side view of a stacker crane.
Figure 3:
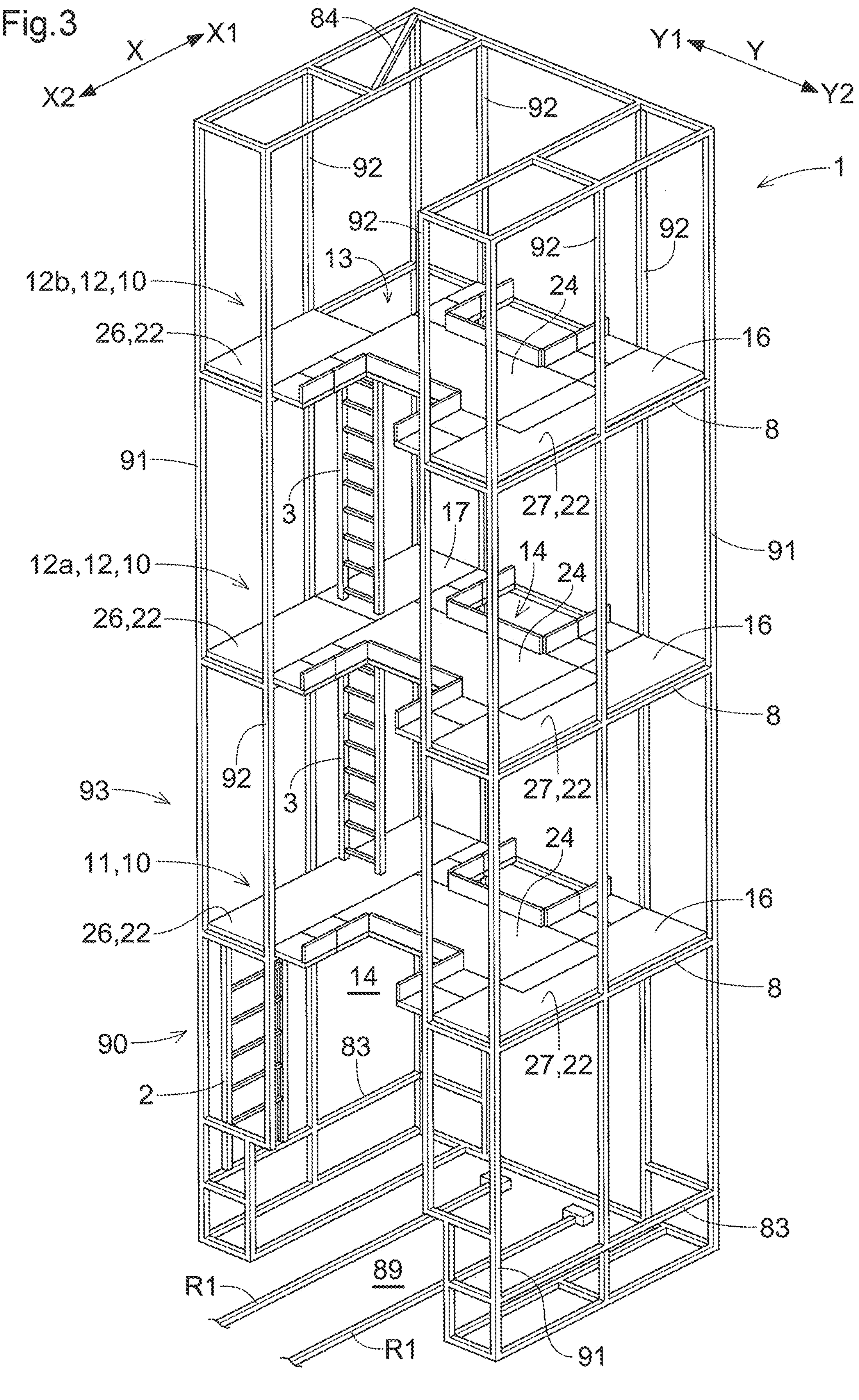
FIG. 3 is a perspective view of a maintenance facility.

As illustrated in FIGS. 1, 2, the stacker crane 4 includes a travel wagon 41 configured to travel along the travel path 6 set along the storage shelf 5, a mast 42 provided on the travel wagon 41 in such a manner as to stand along the up-down direction, and a lifting and lowering body 44 configured to support a transfer device 43 for holding and transferring the article W and to lift and lower along the mast 42. In the present embodiment, the travel wagon 41 is guided by lower rails R1 laid along the travel path 6 and travels. The travel wagon 41 includes a plurality of travel wheels 45, and when the travel wheels 45 roll on the lower rails R1, the travel wagon 41 travels along the travel path 6. In the example of FIGS. 1, 3, a pair of lower rails R1 is laid on a floor face.

As illustrated in FIG. 2, the stacker crane 4 includes, as the mast 42, a first mast member **42*a* and a second mast member 42*b* disposed away from each other in a direction along the travel path 6. The first mast member 42*a* and the second mast member 42*b* are separated from each other in the path direction X. In the example illustrated herein, the first mast member 42*a* is disposed on the first side X1 in the path direction relative to the second mast member 42*b*. Respective upper ends of the first mast member 42*a* and the second mast member 42*b* are connected to each other via an upper frame 46. In the present example, the upper frame 46 is guided by an upper rail R2 along the path direction X. In the present example, as illustrated from FIGS. 1 to 3, the lower rails R1 are disposed along the inbound and outbound conveyor 94 and the storage shelf 5 such that respective ends thereof on the first side X1 in the path direction extend into the maintenance facility 1. In the meantime, the upper rail R2 is disposed along the inbound and outbound conveyor 94 and the storage shelf 5 but is not disposed inside the maintenance facility 1**.

As illustrated in FIG. 2, the lifting and lowering body 44 lifts and lowers along the mast 42 so as to move the article W in the up-down direction. The lifting and lowering body 44 supports the transfer device 43 from below. The article W is put on the transfer device 43 and held by the lifting and lowering body 44. The transfer device 43 moves the article W in the path perpendicular direction Y and transfers the article W between transfer target spots (herein, each storage section in the storage shelf 5 and the inbound and outbound conveyor 94). In the present example, the transfer device 43 has a fork-type transfer mechanism but may be a conveyor device. In a case where the stacker crane 4 is at a position corresponding to the inbound and outbound conveyor 94 (FIG. 1), the lifting and lowering body 44 moves to a height corresponding to the outbound conveyor **94*a* or the inbound conveyor 94*b*. The transfer device 43 transfers the article W to and from these conveyors. Further, in a case where the stacker crane 4 transfers the article W to and from the storage shelf 5 (FIG. 1), when the stacker crane 4 moves to the front of a storage section targeted for the transfer, the lifting and lowering body 44 moves to a height corresponding to the storage section. The transfer device 43** transfers the article W to and from the storage section.

As described above, the stacker crane 4 moves along the path direction X and transports the article W between the inbound and outbound conveyor 94 and the storage shelf 5. In the meantime, in a case where the stacker crane 4 has a malfunction, or maintenance or the like is performed on the stacker crane 4, the stacker crane 4 is moved to the maintenance facility 1. Note that, in a case where the stacker crane 4 is to be moved, an operator may operate a remote control to move the stacker crane 4 to the maintenance facility 1, or when a control device of the automated warehouse 100 detects a malfunction in the stacker crane 4, the stacker crane 4 may be automatically moved to the maintenance facility 1. In the maintenance facility 1, the operator performs a maintenance operation such as repair or maintenance on the stacker crane 4. Note that, herein, the "maintenance" includes adjustment of the stacker crane 4 at the time when the stacker crane 4 is first disposed, adjustment of the stacker crane 4 for periodic inspection, and so on.

As illustrated in FIGS. 1, 3, the maintenance facility 1 is disposed at a position not overlapping with the storage shelf 5 as viewed vertically and is configured to store at least part of the stacker crane 4 while the stacker crane 4 is at a maintenance position 7 set on the travel path 6. As described above, the maintenance facility 1 is adjacent to the first side X1, in the path direction, of the storage shelf 5. Further, the maintenance facility 1 is disposed to surround an end of the travel path 6 for the stacker crane 4 which end is on the first side X1 in the path direction. In the example of FIGS. 1, 3, the maintenance facility 1 is disposed along the path direction X and the path perpendicular direction Y.

Figure 6:
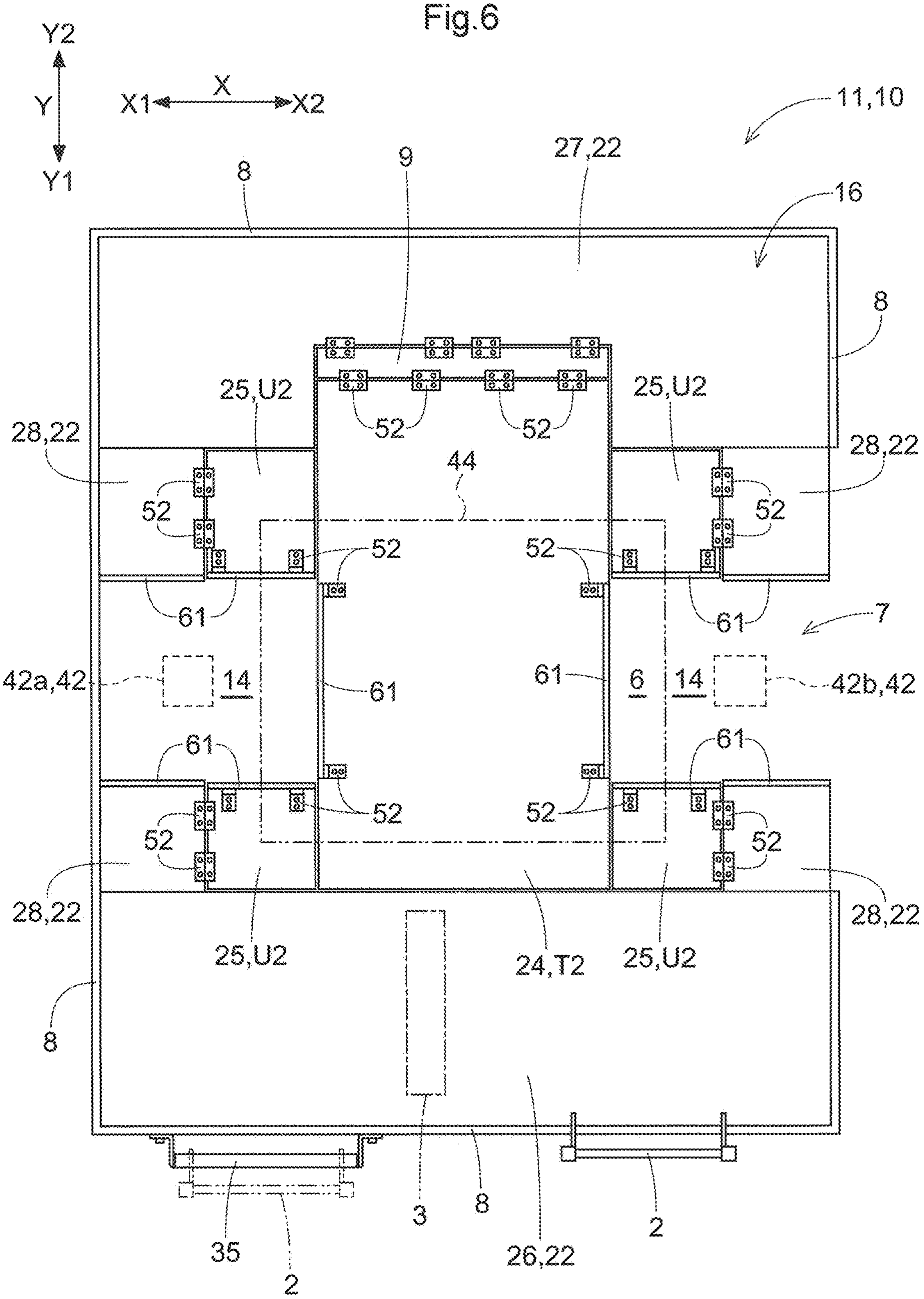
FIG. 6 is a plan view of a first level stage.

In the present embodiment, as illustrated in FIGS. 1, 6, the maintenance facility 1 stores the whole stacker crane 4 at the maintenance position 7. Further, the maintenance facility 1 does not come into contact with the stacker crane 4 moving along the travel path 6 and entering the maintenance facility 1. Note that the maintenance facility 1 may be configured to store part of the stacker crane 4. For example, either of the first mast member 42*a* and the second mast member 42*b* may be disposed at a position not overlapping with the maintenance facility 1 as viewed vertically, or the upper frame 46 may be disposed at a position higher than the upper end of the maintenance facility 1. A specific configuration of the maintenance facility 1 will be described below.

As illustrated in FIG. 3, the maintenance facility 1 includes a plurality of work stages 10 arranged in the up-down direction. The work stages 10 are disposed above the travel wagon 41. Accordingly, the operator can perform the maintenance operation on a portion of the stacker crane 4 which portion is above the travel wagon 41, by use of the work stages 10. In the following description, one work stage 10 among the plurality of work stages 10 disposed above the travel wagon 41 is referred to as a first level stage 11, and work stages 10 above the first level stage 11 are each referred to as an upper level stage 12. In the present embodiment, the first level stage 11 is a lowermost work stage 10 among the plurality of work stages 10.

In the present embodiment, as illustrated in FIG. 3, the maintenance facility 1 includes, as the upper level stage 12, a first upper level stage 12*a*, and a second upper level stage 12*b* one stage higher than the first upper level stage 12*a*. That is, the maintenance facility 1 includes the first level stage 11 as the lowermost work stage 10, the first upper level stage 12*a* one stage higher than the first level stage 11, and the second upper level stage 12*b*. Here, it is preferable that the height from the floor face to the first level stage 11, the height from the first level stage 11 to the first upper level stage 12*a*, and the height from the first upper level stage 12*a* to the second upper level stage 12*b* be set to be slightly higher than the height of a general operator. For example, it is preferable that these heights be set to about the same height as a maximum position in the up-down direction that the operator standing on the work stage 10 can reach. When the plurality of work stages 10 is provided as such, it is possible to avoid such a situation that the operator performs a maintenance operation on an area above the maximum position in the up-down direction that the operator standing on the work stage 10 can reach. On this account, it is not necessary to use a relatively tall stepladder or the like, and it is possible to improve working efficiency of an operator who operates on each work stage 10 and safety for the operator.

In the example of FIG. 3, as described above, the first level stage 11, the first upper level stage 12*a*, and the second upper level stage 12*b* are arranged in the up-down direction, but the work stage 10 may be further provided above the second upper level stage 12*b* depending on the scale of the stacker crane 4 to be used. Alternatively, as the upper level stage 12, only the first upper level stage 12*a* may be provided. An additional stage where the operator works may be provided between the floor face and the first level stage 11. For example, the operator can use the additional stage as a scaffold to perform a maintenance operation on the travel wagon 41 or the lifting and lowering body 44 and the transfer device 43 disposed between the floor face and the first level stage 11. Thus, in the present example, a work scaffold (a stage) different from the work stage 10 may be provided between the lowermost work stage 10 and the floor face. Similarly, a work scaffold different from the work stage 10 may be provided between a given work stage 10 and a work stage 10 one stage higher than the given work stage 10.

As illustrated in FIGS. 5 to 9, the first level stage 11 and the upper level stage 12 each include a mast penetration portion 14 through which the mast 42 of the stacker crane 4 at the maintenance position 7 passes in the up-down direction, a stage scaffold 16 provided in a region other than the mast penetration portion and functioning as a scaffold for the operator, and a support frame 8 configured to support the stage scaffold 16. In the present embodiment, the work stage 10 (herein, the first level stage 11, the first upper level stage 12*a*, and the second upper level stage 12*b*) is a region surrounded by the outer edge of the stage scaffold 16 and includes the mast penetration portion 14. The support frame 8 configured to support each of the plurality of work stages 10 is disposed at a position around the outer periphery of each of the plurality of work stages 10. In the present example, a plurality of support frames 8 is provided to correspond to the plurality of the work stages 10. Here, to be "disposed at the position around the outer periphery of the work stage 10" is not limited to a case where the support frame 8 is disposed in the whole region (in other words, the whole circumference) at the position around the outer periphery of the work stage 10 and also includes a case where the support frame 8 is disposed at only part of the position (in other words, only part of the whole circumference) around the outer periphery of the work stage 10. In the example in FIG. 3 and FIGS. 6 to 9, no support frame 8 is provided at a position in contact with the travel path 6 for the stacker crane 4, in the position around the outer periphery of the work stage 10.

As illustrated in FIG. 3, the maintenance facility 1 includes a plurality of support poles 91 standing on the floor face in the up-down direction. In the present example, the plurality of support poles 91 is disposed separately in the path direction X and in the path perpendicular direction Y such that the maintenance facility 1 has a rectangular solid shape as a whole. The plurality of (herein, three) support frames 8 is supported on the support poles 91 such that the support frames 8 are away from each other in the up-down direction. The support frame 8 is disposed along the path direction X and the path perpendicular direction Y and has a rectangular shape as viewed vertically. A pair of mast penetration portions 14 is provided to correspond to the first mast member 42*a* and the second mast member 42*b* at the maintenance position 7. The pair of mast penetration portions 14 is arranged along the travel path 6 and separated from each other in the path direction X. In the example in FIGS. 5 to 9, the support frame 8 corresponding to each work stage 10 supports the opposite ends of the stage scaffold 16 in the path perpendicular direction Y and supports the opposite ends of the stage scaffold 16 in the path direction X. In the meantime, no support frame 8 is provided in an area corresponding to the mast penetration portion 14 on the second side X2 in the path direction. Hereby, the stacker crane 4 can move from the second side X2 in the path direction to the first side X1 in the path direction to enter the maintenance facility 1. Note that, in the example illustrated herein, the maintenance facility 1 includes a plurality of longitudinal members 92 for reinforcing the maintenance facility 1, separately from the plurality of support poles 91. The support frame 8 is also supported on the plurality of longitudinal members 92.

As illustrated from FIGS. 6 to 9, when the stacker crane 4 enters the maintenance facility 1, the first mast member 42*a* is disposed in the mast penetration portion 14 on the first side X1 in the path direction, and the second mast member 42*b* is disposed in the mast penetration portion 14 on the second side X2 in the path direction. In addition, the lifting and lowering body 44 is disposed at a position in no contact with the work stage 10 in the up-down direction and is disposed to overlap with an intermediate region (more specifically, part of the pair of mast penetration portions 14, and a movable scaffold 24 and an auxiliary scaffold 25 to be described later) of the work stage 10 as viewed vertically. In the present example, the position where the stacker crane 4 is disposed as such is the maintenance position 7.

Figure 4:
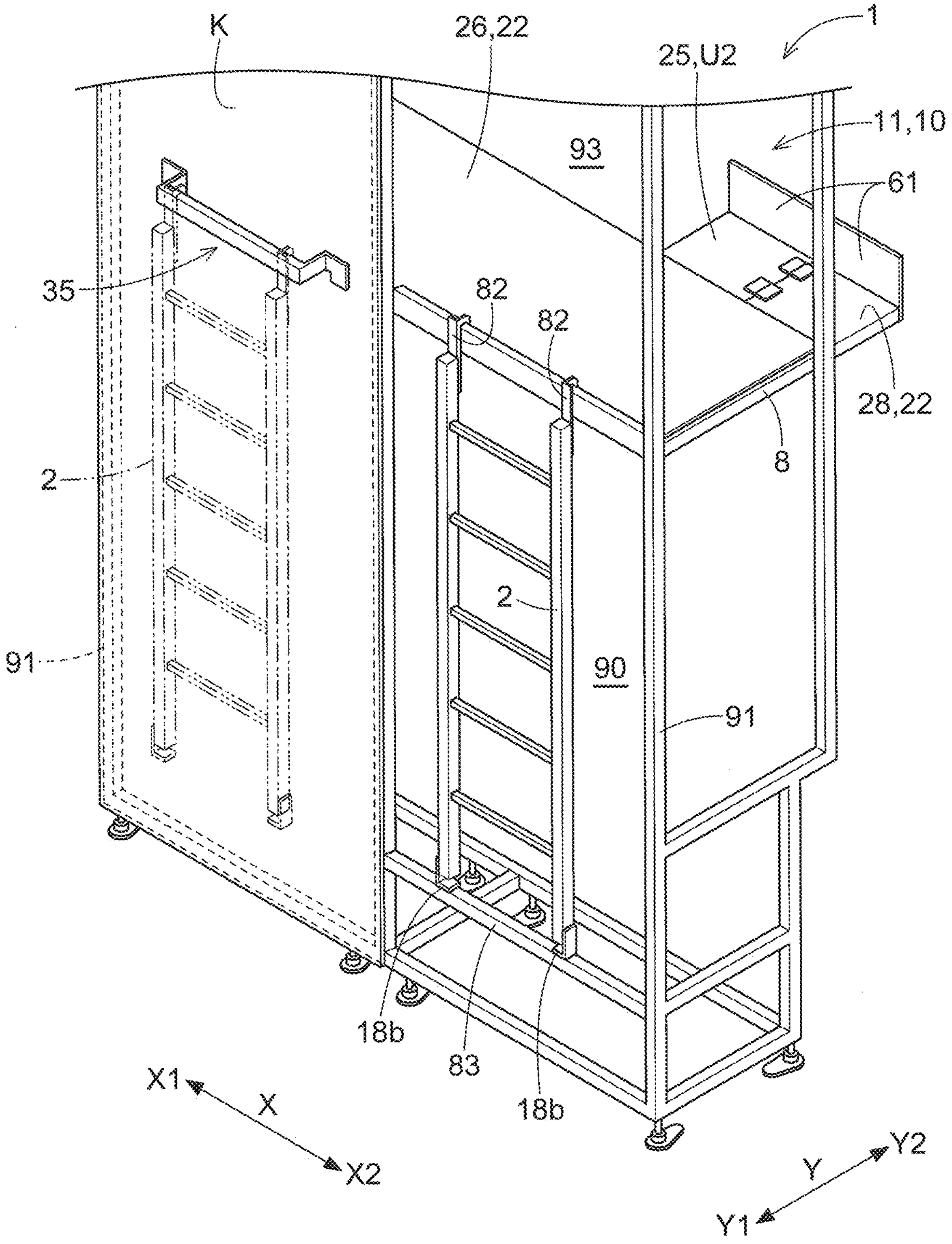
FIG. 4 is a perspective view schematically illustrating a first level ladder being attached.

As illustrated in FIG. 4, in the present example, the maintenance facility 1 includes a wall K covering the inside of the maintenance facility 1. The wall K is disposed to cover a region other than a first doorway 90 and a second doorway 93 of the maintenance facility 1, and a region blocking the travel path 6 for the stacker crane 4 (herein, a region where the stacker crane 4 moves in and out from the mast penetration portion 14 on the second side X2 in the path direction), and the wall K is supported on the plurality of support poles 91. The first doorway 90 is provided between the floor face and the lowermost work stage 10 (the first level stage 11). The operator passes through the first doorway 90 and enters a working area between the floor face and the first level stage 11. In the example of FIG. 4, a first level ladder 2 (described later) is disposed in the first doorway 90, but in a case where the operator enters and leaves the working area between the floor face and the first level stage 11, the first level ladder 2 is detached from the first doorway 90. The second doorway 93 is provided between the first level stage 11 and the first upper level stage 12*a*. When the operator passes through the second doorway 93, the operator can enter the first upper level stage 12*a*. Note that the wall K may not necessarily be provided, and a region where the wall K is disposed can be modified appropriately. In FIG. 3, the wall K is not illustrated.

As illustrated in FIGS. 5 to 9, the stage scaffold 16 includes a fixed scaffold 22 fixed to the support frame 8, and the movable scaffold 24. In the present embodiment, the stage scaffold 16 further includes the auxiliary scaffold 25. The fixed scaffold 22 and the movable scaffold 24 are provided on the stage scaffold 16 of each of the first level stage 11, the first upper level stage 12*a*, and the second upper level stage 12*b*. Note that, in the present example, the first upper level stage 12*a* and the second upper level stage 12*b* have the same structure. Accordingly, in the following description, the first upper level stage 12*a* and the second upper level stage 12*b* may be described collectively as the upper level stage 12, as necessary.

Figure 7:
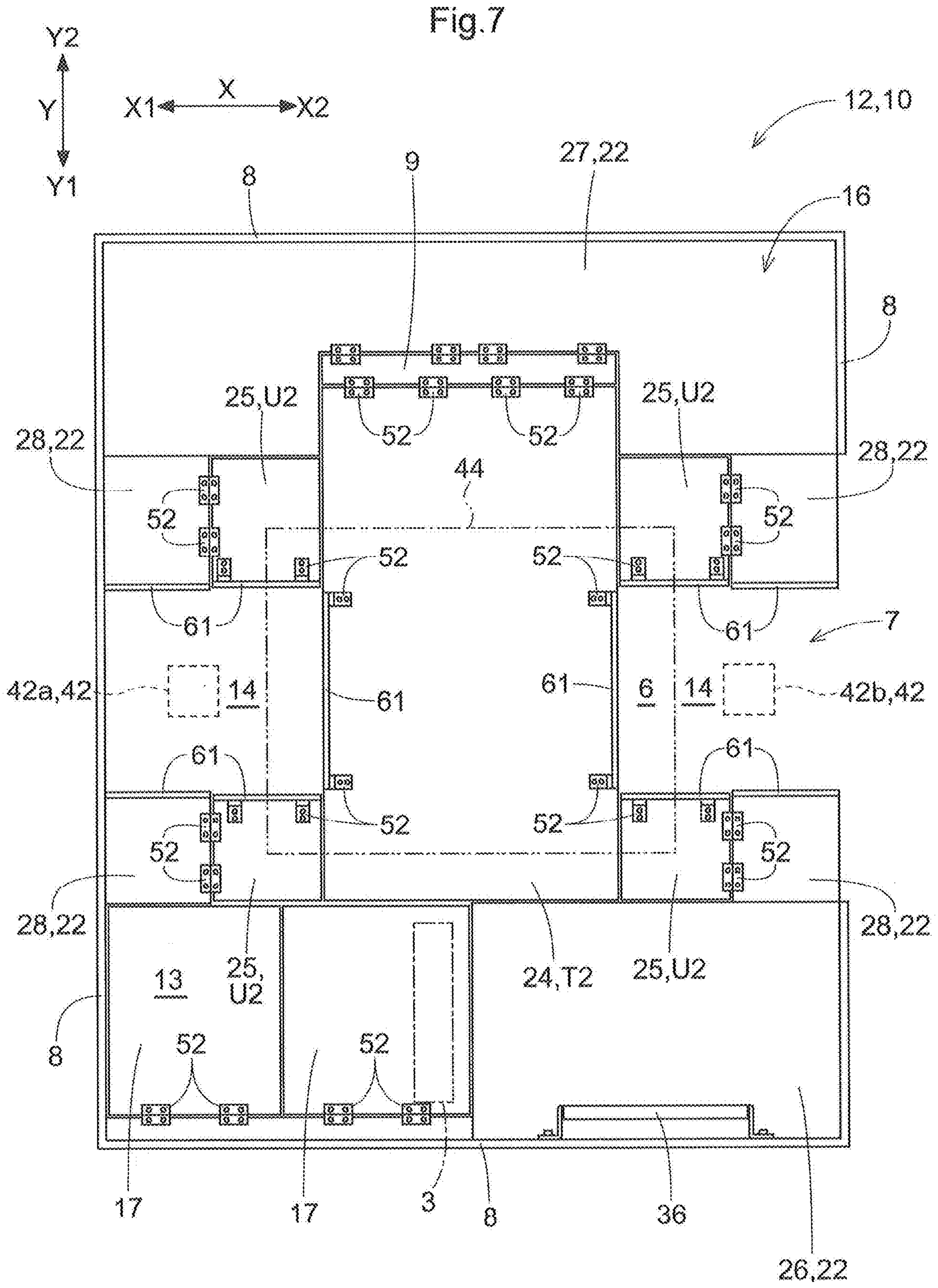
FIG. 7 is a plan view of the upper level stage.
Figure 8:
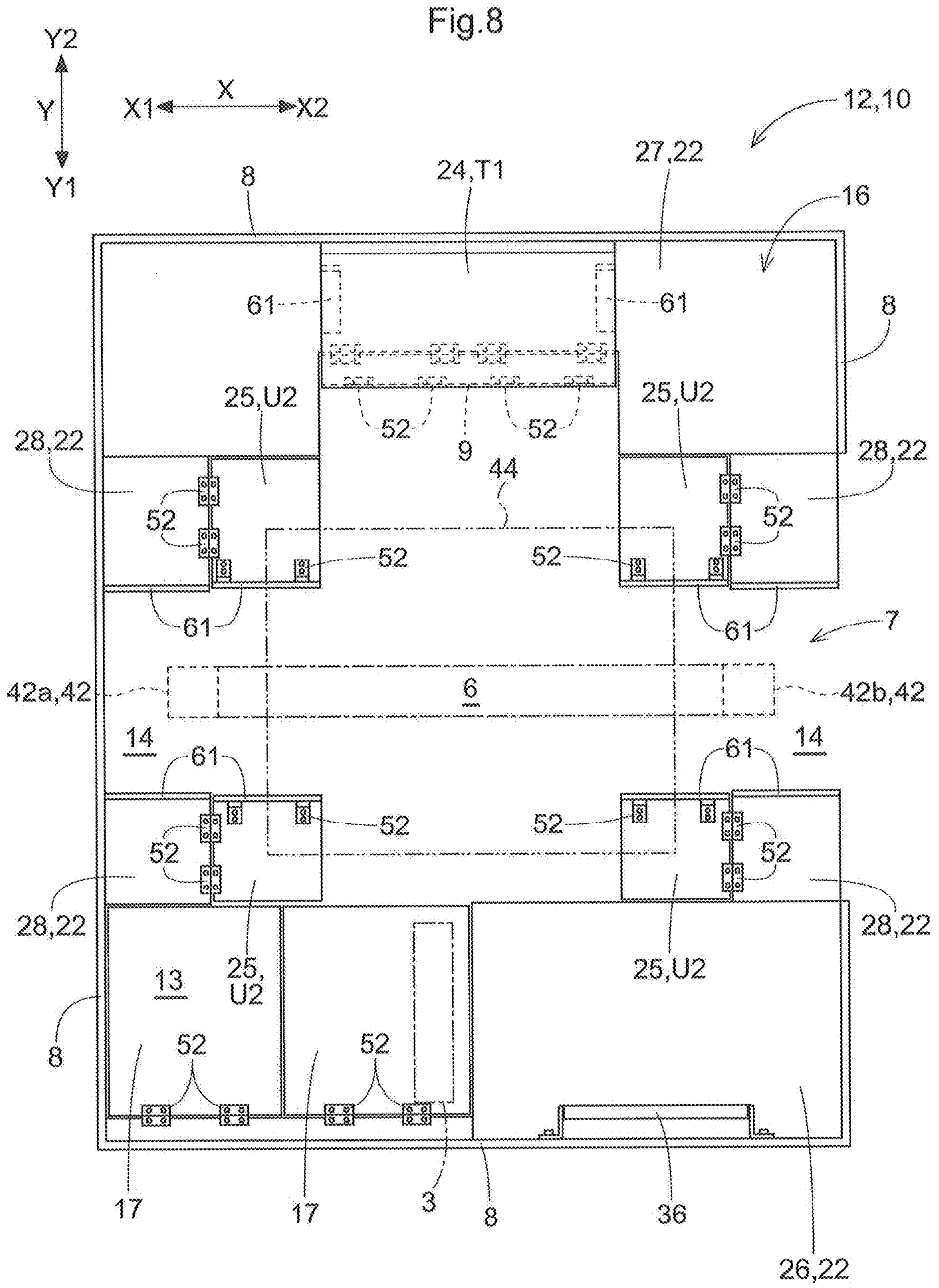
FIG. 8 is a plan view of the upper level stage.
Figure 9:
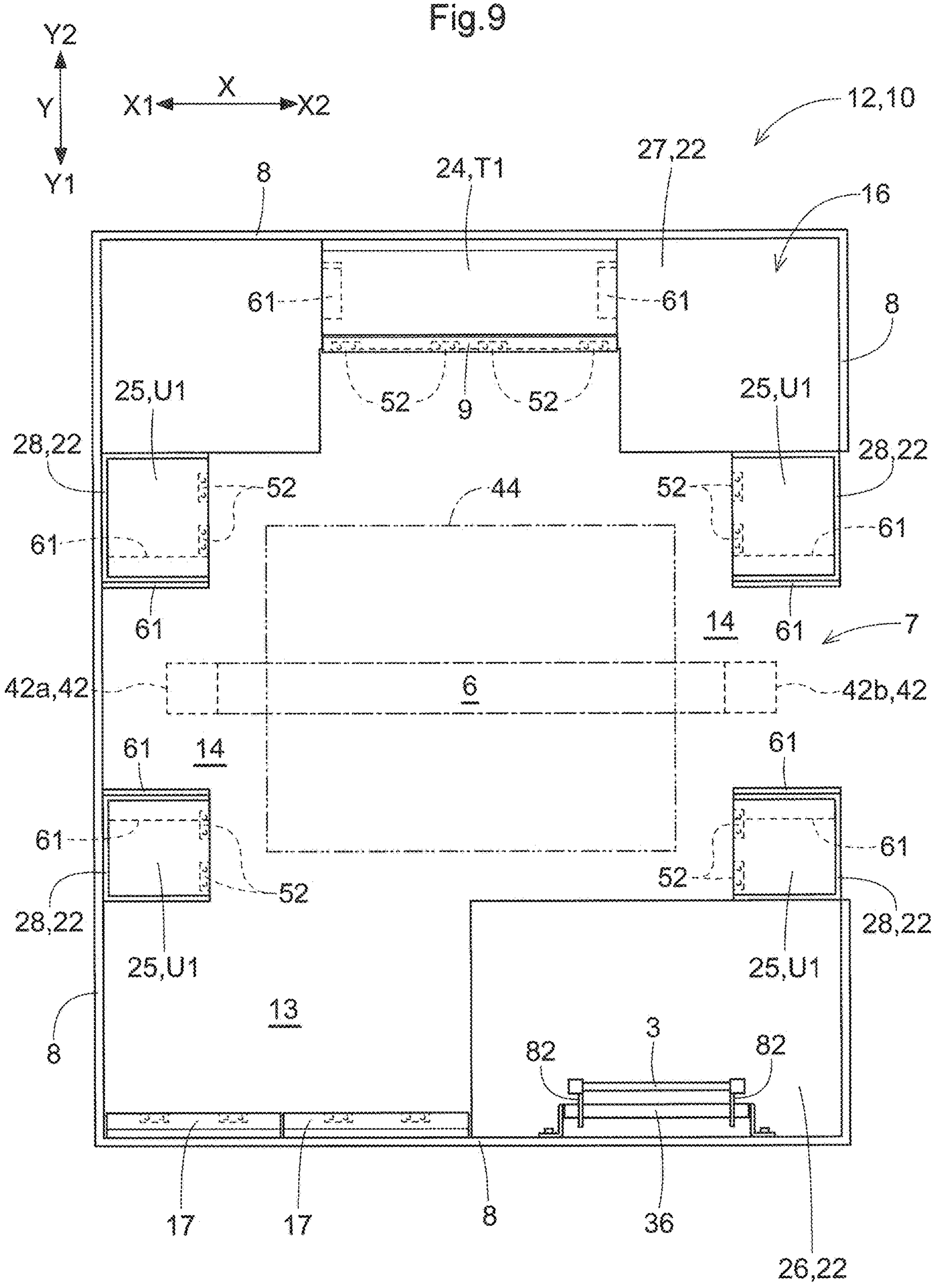
FIG. 9 is a plan view of the upper level stage.

As illustrated in FIGS. 5 to 9, the fixed scaffold 22 includes a first-side fixed scaffold 26 disposed on one side in the path perpendicular direction Y across a path (an alternate long and short dash line in FIGS. 8, 9) of the mast 42, and a second-side fixed scaffold 27 disposed on the other side in the path perpendicular direction Y. The fixed scaffold 22 also includes a plurality of inner fixed scaffolds 28 disposed inwardly from the first-side fixed scaffold 26 and the second-side fixed scaffold 27 in the path perpendicular direction Y. In the present example, as illustrated in FIGS. 6, 7, in each of the first level stage 11 and the upper level stage 12, the first-side fixed scaffold 26 is disposed on a first side in a path width direction relative to the second-side fixed scaffold 27. The travel path 6 for the stacker crane 4, including the mast penetration portion 14, is formed between the first-side fixed scaffold 26 and the second-side fixed scaffold 27. The second-side fixed scaffold 27 is disposed over the whole area in the path direction X on each of the first level stage 11 and the upper level stage 12. The first-side fixed scaffold 26 is disposed over the whole area in the path direction X on the first level stage 11 (FIG. 6). However, on the upper level stage 12, the first-side fixed scaffold 26 is not disposed over the whole area in the path direction X (FIGS. 7 to 9). On the upper level stage 12, the first-side fixed scaffold 26 is disposed adjacent to the second side X2, in the path direction, of a passage penetration portion 13 (described later).

A plurality of (herein, four) inner fixed scaffolds 28 is disposed separately in the path direction X and in the path perpendicular direction Y across the path of the movable scaffold 24. The inner fixed scaffolds 28 are disposed inwardly from the first-side fixed scaffold 26 and the second-side fixed scaffold 27 in the path perpendicular direction Y and separately disposed in the opposite ends of the work stage 10 in the path direction X. In the example in FIGS. 6 to 9, two inner fixed scaffolds 28 disposed on the first side X1 in the path direction among the four inner fixed scaffolds 28 are supported on the support frame 8. Two inner fixed scaffolds 28 disposed on the second side X2 in the path direction are each supported on a corresponding one of the first-side fixed scaffold 26 and the second-side fixed scaffold 27.

Figure 11:
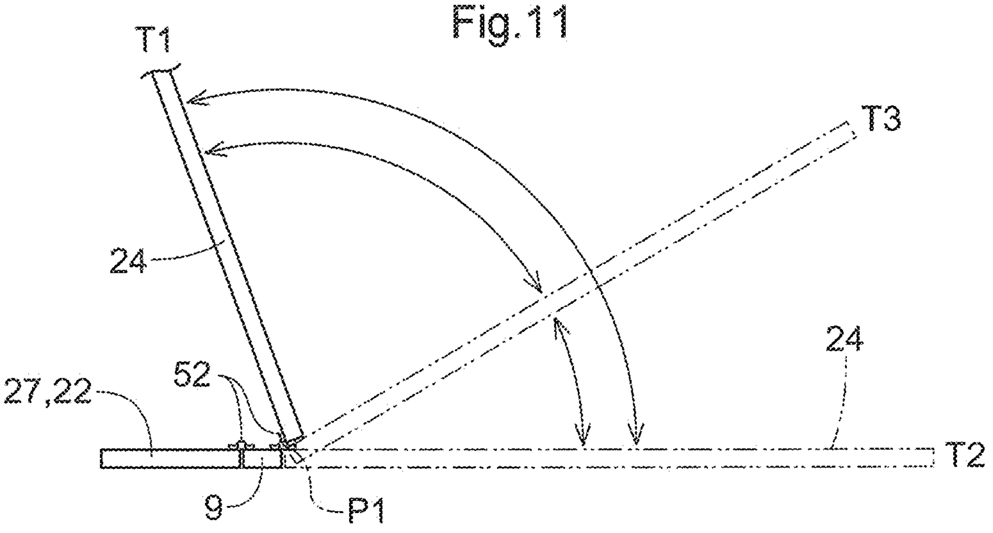
FIG. 11 is a side view schematically illustrating a movable scaffold changing its posture.

As illustrated in FIGS. 5 to 9 and FIG. 11, the movable scaffold 24 is changeable between a first retracting posture T1 and a first deployment posture T2. The first retracting posture T1 is a posture where the movable scaffold 24 does not come into contact with the path of the mast 42 when the travel wagon 41 travels along the travel path 6, and in the first retracting posture T1, the movable scaffold 24 does not function as a scaffold for the operator. The first deployment posture T2 is a posture where the movable scaffold 24 comes into contact with the path of mast 42 but does not come into contact with the mast 42 of the stacker crane 4 at the maintenance position 7, and in the first deployment posture T2, the movable scaffold 24 functions as a scaffold for the operator. As illustrated in FIG. 11, in the first retracting posture T1, the movable scaffold 24 stands, and in the first deployment posture T2, the movable scaffold 24 is along a horizontal plane. In the present embodiment, in a case where the movable scaffold 24 is in the first retracting posture T1, the travel path 6 for the stacker crane 4 is not blocked by the movable scaffold 24 as illustrated in FIGS. 8, 9. In a case where the movable scaffold 24 is in the first deployment posture T2, the travel path 6 for the stacker crane 4 is blocked by the movable scaffold 24 as illustrated in FIGS. 6, 7. More specifically, in the first deployment posture T2, the movable scaffold 24 is disposed to overlap with the travel path 6 as viewed vertically. In the present embodiment, the movable scaffold 24 in the first deployment posture T2 is disposed between the first mast member 42*a* and the second mast member 42*b* of the stacker crane 4 at the maintenance position 7. In other words, the movable scaffold 24 in the first deployment posture T2 is disposed between the pair of mast penetration portions 14. Further, the movable scaffold 24 in the first deployment posture T2 is disposed over the first-side fixed scaffold 26 and the second-side fixed scaffold 27. In other words, when the movable scaffold 24 is in the first deployment posture T2, the first-side fixed scaffold 26 and the second-side fixed scaffold 27 are connected to each other.

As illustrates in FIGS. 5 to 9 and FIG. 11, the movable scaffold 24 is configured to swing around a swing axis P1 attached to the fixed scaffold 22. More specifically, the movable scaffold 24 is configured to swing around the swing axis P1 attached to the second-side fixed scaffold 27. In the present example, the movable scaffold 24 is attached to the second-side fixed scaffold 27 via coupling mechanisms 52. Herein, the coupling mechanisms 52 are hinges. When the movable scaffold 24 swings around the swing axis P1 along the path direction X via the coupling mechanisms 52, the movable scaffold 24 can be changed between the first retracting posture T1 and the first deployment posture T2. In the example in FIGS. 5 to 9, the second-side fixed scaffold 27 has a recessed shape recessed toward the second side Y2 in the path perpendicular direction as viewed vertically. The movable scaffold 24 is attached to a recessed portion (a portion cut toward the second side Y2 in the path perpendicular direction) of the second-side fixed scaffold 27 having a recessed shape in such a manner as to be swingable around the swing axis P1 along the path direction X. As illustrated in FIGS. 6, 7, the movable scaffold 24 in the first deployment posture T2 is disposed to connect the first-side fixed scaffold 26 to the second-side fixed scaffold 27. When the operator moves the movable scaffold 24 in the path perpendicular direction Y, the operator can move between the first-side fixed scaffold 26 and the second-side fixed scaffold 27. As illustrated in FIGS. 8, 9, 11, the movable scaffold 24 in the first retracting posture T1 is disposed to overlap with the second-side fixed scaffold 27 as viewed vertically. In a case where the movable scaffolds 24 of all the work stages 10 are in the first retracting posture T1, the travel path 6 is not blocked by the movable scaffolds 24. This allows the stacker crane 4 to move on the travel path 6 to outside the maintenance facility 1 and to the maintenance position 7 in the maintenance facility 1.

As illustrates in FIGS. 5 to 9 and FIG. 11, the maintenance facility 1 includes a biasing mechanism 9 configured to bias the movable scaffold 24 in a swing direction around the swing axis P1. The biasing mechanism 9 is configured to bias the movable scaffold 24 toward the first retracting posture T1. In the present example, the movable scaffold 24 is attached to the second-side fixed scaffold 27 via the coupling mechanisms 52 and the biasing mechanism 9. In the present example, the biasing mechanism 9 is provided separately from the coupling mechanisms 52, but the coupling mechanisms 52 may have a function of the biasing mechanism 9. For example, the coupling mechanisms 52 and the biasing mechanism 9 can be a hinge with power assistance. In the present embodiment, as illustrated in FIG. 11, the torque of the biasing mechanism 9 is larger than a torque around the swing axis P1 which torque is applied to the movable scaffold 24 by self-weight of the movable scaffold 24 when the movable scaffold 24 is disposed closer to the first retracting posture T1 than an intermediate posture T3, and the torque of the biasing mechanism 9 is smaller than a torque around the swing axis P1 which torque is applied to the movable scaffold 24 by self-weight of the movable scaffold 24 when the movable scaffold 24 is disposed closer to the first deployment posture T2 than the intermediate posture T3. Here, the intermediate posture T3 is an intermediate posture between the first retracting posture T1 and the first deployment posture T2. In the present example, when the operator moves up and down between the floor face and the first level stage 11 or the upper level stage 12, the operator uses the first-side fixed scaffold 26. The operator on the first-side fixed scaffold 26 changes the posture of the movable scaffold 24. Here, when the operator catches the movable scaffold 24 in the first retracting posture T1 by use of a hook rod or the like and pulls the movable scaffold 24 toward the first side Y1 in the path perpendicular direction, for example, the movable scaffold 24 in the first retracting posture T1 can be changed to the first deployment posture T2. When the operator changes the movable scaffold 24 in the first deployment posture T2 to the first retracting posture T1, the operator swings and lifts the movable scaffold 24 by use of a handle (not illustrated) of the movable scaffold 24 in the first deployment posture T2. Since the operator can use the biasing mechanism 9, the operator can change the posture of the movable scaffold 24 with a relatively small force in comparison with a case where the biasing mechanism 9 is not provided.

Figure 13:
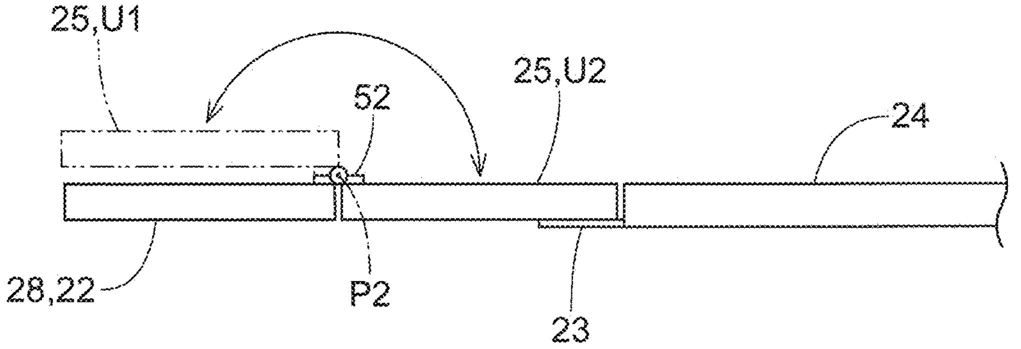
FIG. 13 is a side view schematically illustrating the auxiliary scaffold in a second retracting posture being supported.

As illustrates in FIGS. 5 to 9 and FIG. 13, the auxiliary scaffold 25 is coupled with the fixed scaffold 22 or the support frame 8 via the coupling mechanisms 52. In the present example, the auxiliary scaffold 25 is coupled with the fixed scaffold 22 (herein, the inner fixed scaffold 28) via the coupling mechanisms 52. A plurality of auxiliary scaffolds 25 is provided to correspond to a plurality of inner fixed scaffolds 28. The auxiliary scaffold 25 is disposed between the inner fixed scaffold 28 and the movable scaffold 24 in the first deployment posture T2. In the example illustrated herein, the plurality of auxiliary scaffolds 25 is disposed on the opposite sides in the path perpendicular direction Y across the travel path 6 for the stacker crane 4, including the pair of mast penetration portions 14, and on the opposite sides in the path direction X across the movable scaffold 24 in the first deployment posture T2. In the present embodiment, the auxiliary scaffold 25 is changeable between a second retracting posture U1 which does not come into contact with a path (an alternate long and two short dashes line in FIGS. 6 to 9) to lift and lower the lifting and lowering body 44 of the stacker crane 4 at the maintenance position 7 and which does not allow the auxiliary scaffold 25 to function as a scaffold for the operator and a second deployment posture U2 which comes into contact with the path of the lifting and lowering body 44 of the stacker crane 4 at the maintenance position 7 and which allows the auxiliary scaffold 25 to function as a scaffold for the operator. Each of the plurality of auxiliary scaffolds 25 is disposed as described above in the second deployment posture U2. Herein, the coupling mechanisms 52 are hinges. As illustrated in FIG. 13, when the auxiliary scaffold 25 swings around a swing axis P2 along the path perpendicular direction Y via the coupling mechanisms 52, the auxiliary scaffold 25 is changeable between the second retracting posture U1 and the second deployment posture U2. The auxiliary scaffold 25 in the second deployment posture U2 connects the inner fixed scaffold 28 to the movable scaffold 24 in the first deployment posture T2. In the present example, the auxiliary scaffold 25 in the second retracting posture U1 is disposed to overlap with the inner fixed scaffold 28 as viewed vertically. In the example illustrated herein, the auxiliary scaffold 25 in the second retracting posture U1 is along the horizontal plane but can have a standing posture like the movable scaffold 24 in the first retracting posture T1. Here, in the present embodiment, as illustrated in FIG. 13, the movable scaffold 24 includes a support section 23 configured to support, from below, a portion of the auxiliary scaffold 25 which portion is different from a portion provided with the coupling mechanisms 52. A plurality of (here, four) support sections 23 is provided to correspond to the plurality of auxiliary scaffolds 25. The support sections 23 are provided to project outwardly in the path direction X from ends of the movable scaffold 24 in the path direction X. The support sections 23 are disposed to support the auxiliary scaffolds 25 in the second deployment posture U2 from below. Thus, the auxiliary scaffold 25 is supported on the inner fixed scaffold 28 and the support section 23. Further, in the present embodiment, the support section 23 supports the auxiliary scaffold 25 on a side opposite from the coupling mechanisms 52 across the auxiliary scaffold 25. Thus, the auxiliary scaffold 25 in the second deployment posture U2 can be supported by the coupling mechanisms 52 (the hinges attached to the inner fixed scaffold 28) and the support section 23 provided separately in the path direction X, thereby making it possible to easily increase stability of the auxiliary scaffold 25 in the second deployment posture U2. Note that the support section 23 configured to support the auxiliary scaffold 25 may not necessarily be provided in the movable scaffold 24. When the support section 23 is not provided in the movable scaffold 24, for example, the auxiliary scaffold 25 can changed to a deployment posture earlier than the movable scaffold 24. Note that, in the following description, respective postures of the movable scaffold 24 and the auxiliary scaffold 25 may be collectively referred to as the "retracting posture" and the "deployment posture."

As illustrated in FIGS. 8, 9, the auxiliary scaffold 25 in the second deployment posture U2 overlaps with the lifting and lowering body 44 at the maintenance position 7 as viewed vertically. In the meantime, the auxiliary scaffold 25 in the second retracting posture U1 does not overlap with the lifting and lowering body 44 at the maintenance position 7 as viewed vertically. Accordingly, as illustrated in FIG. 8 in a case where the auxiliary scaffolds 25 are in the second deployment posture U2 and the movable scaffold 24 is in the first retracting posture T1 in a given work stage 10, when the stacker crane 4 is disposed at the maintenance position 7, the lifting and lowering body 44 cannot pass through the given work stage 10 in the up-down direction. As illustrated in FIG. 9, in a case where the auxiliary scaffolds 25 are in the second retracting posture U1 and the movable scaffold 24 is in the first retracting posture T1 in a given work stage 10, when the stacker crane 4 is disposed at the maintenance position 7, the lifting and lowering body 44 can pass through the given work stage 10 in the up-down direction.

Figure 12:
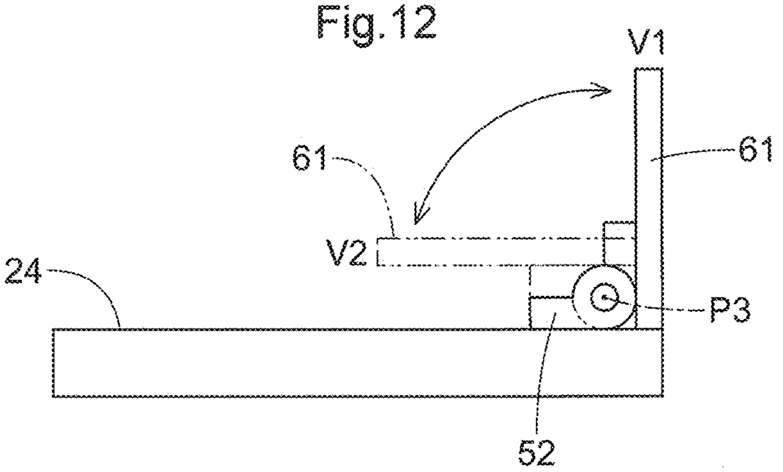
FIG. 12 is a side view schematically illustrating an auxiliary scaffold changing its posture.

In the present embodiment, as illustrates in FIGS. 5 to 9 and FIG. 12, guide fences 61 are provided along the opposite edges of the movable scaffold 24 in the path direction X. The guide fence 61 is changeable between a guide posture V1 standing relative to the movable scaffold 24 and a folding posture V2 along the movable scaffold 24. The guide fences 61 are provided on the opposite edges of the movable scaffold 24 in the path direction X, in an area where the guide fences 61 come into contact with the travel path 6 when the movable scaffold 24 is in the first deployment posture T2. In the example illustrated herein, a pair of guide fences 61 is disposed such that the guide fences 61 are in respective intermediate regions of the opposite edges of the movable scaffold 24 in the path direction X. The guide fences 61 are connected to the movable scaffold 24 via the coupling mechanisms 52. Herein, the coupling mechanisms 52 are hinges. As illustrated in FIG. 12, when the guide fence 61 swings around a swing axis P3 along the path perpendicular direction Y via the coupling mechanisms 52, the guide fence 61 changes between the guide posture V1 and the folding posture V2. The guide fence 61 in the folding posture V2 overlaps with the movable scaffold 24 in the first deployment posture T2 as viewed vertically. In the example illustrated herein, the guide fence 61 in the folding posture V2 is a posture along the horizontal plane but is not limited to this.

Figure 5:
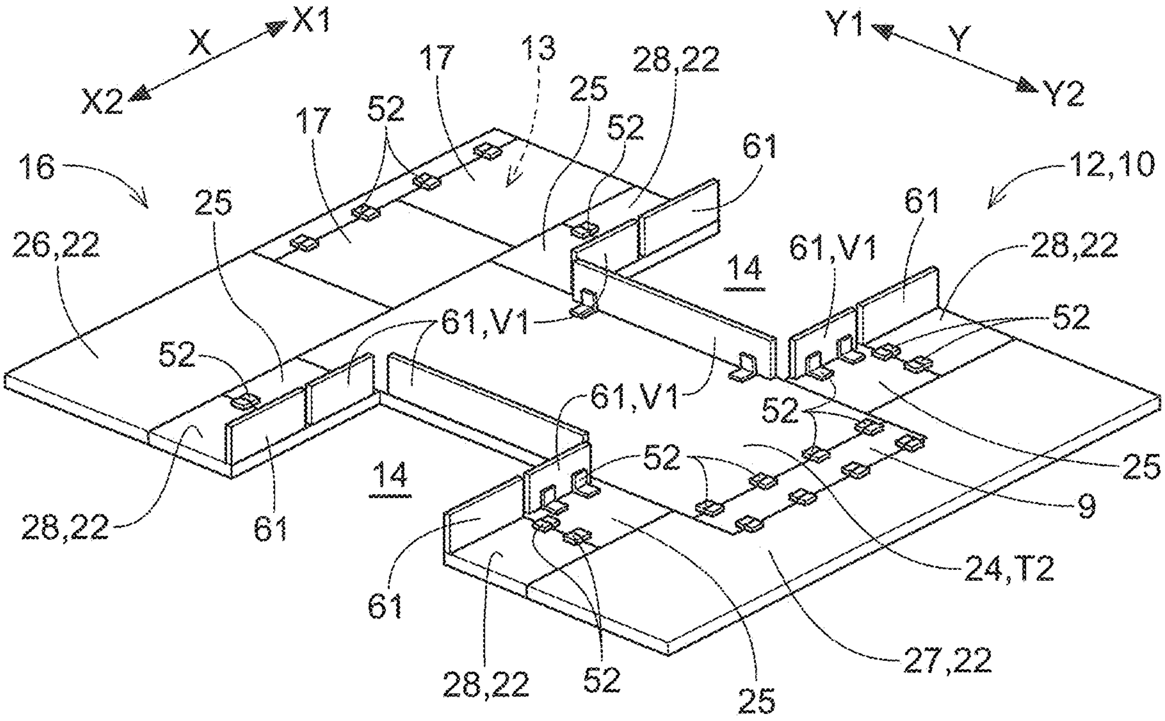
FIG. 5 is a perspective view schematically illustrating a work stage on an upper level stage.

Further, a plurality of guide fences 61 configured as such is provided in scaffolds other than the movable scaffold 24. As illustrated in FIGS. 5 to 9, the guide fences 61 are further provided in the auxiliary scaffold 25 and the fixed scaffold 22 (here, the inner fixed scaffold 28). In the present example, the guide fence 61 is provided on an inner side edge (on a side facing the mast penetration portion 14), in the path perpendicular direction Y, of each of the auxiliary scaffold 25 and the inner fixed scaffold 28 adjacent to each other in the path direction X. The guide fence 61 provided in the auxiliary scaffold 25 via the coupling mechanisms 52 (herein, hinges) is changeable between a guide posture V1 standing relative to the auxiliary scaffold 25 and a folding posture V2 along the auxiliary scaffold 25, similarly to the guide fence 61 provided in the movable scaffold 24. In the meantime, the guide fence 61 provided in the inner fixed scaffold 28 is fixed in a standing manner relative to the inner fixed scaffold 28 and is not changeable in posture. The example of FIG. 5 illustrates all the guide fences 61 being standing when the movable scaffold 24 is in the first deployment posture T2 and the auxiliary scaffolds 25 are in the second deployment posture U2. Thus, by providing the guide fences 61 in all portions of the stage scaffold 16 which portions are adjacent to the mast penetration portions 14, it is possible to restrain such a situation that the operator who performs a maintenance operation in the stage scaffold 16 loses his or her footing toward the mast penetration portion 14 or a tool, a component, or the like put on the stage scaffold 16 falls into the mast penetration portion 14 by mistake. Note that, in a case where each of the movable scaffold 24 and the auxiliary scaffold 25 is changed to the retracting posture (the first retracting posture T1, the second retracting posture U1), it is preferable that the guide fences 61 have to be changed to the folding posture V2 in advance. This makes it possible to easily avoid such a situation that, due to the posture change of the movable scaffold 24 or the auxiliary scaffold 25 with the guide fences 61 being in the guide posture V1, the guide fences 61 come into contact with other members or the like, and the movable scaffold 24 or the auxiliary scaffold 25 takes a half-done posture instead of an appropriate retracting posture, for example.

As illustrated in FIG. 3 and FIGS. 7 to 9, the upper level stage 12 includes the passage penetration portion 13 passing through the upper level stage 12 in the up-down direction so that the operator can pass through the passage penetration portion 13 in the up-down direction by use of an upper level ladder 3. The passage penetration portion 13 is disposed at a position overlapping with the stage scaffold 16 of the first level stage 11 as viewed vertically. In the present embodiment, each of the first upper level stage 12*a* and the second upper level stage 12*b* includes the passage penetration portion 13. The operator passes through the passage penetration portion 13 of the first upper level stage 12*a* to move from the first level stage 11 to the first upper level stage 12*a*. Similarly, the operator passes through the passage penetration portion 13 of the second upper level stage 12*b* to move from the first upper level stage 12*a* to the second upper level stage 12*b*. When the operator passes through the passage penetration portion 13, the operator uses the upper level ladder 3 provided in each of the first level stage 11 and the first upper level stage 12*a*. Such a passage penetration portion 13 is disposed at a position overlapping with the first-side fixed scaffold 26 of the first level stage 11 as viewed vertically.

In the present example, the passage penetration portion 13 is provided at a position adjacent to the first side X1, in the path direction, of the first-side fixed scaffold 26 in the upper level stage 12. No passage penetration portion 13 is provided on a side of the upper level stage 12 on which side the second-side fixed scaffold 27 is disposed. In the example illustrated herein, the passage penetration portion 13 is disposed to be surrounded by the inner fixed scaffold 28, the auxiliary scaffold 25, the first-side fixed scaffold 26, and the support frame 8. In the present embodiment, as illustrated in FIGS. 5 to 9, the upper level stage 12 includes an openable and closable scaffold 17 as part of the stage scaffold 16. The openable and closable scaffold 17 is changeable between a closed state (FIG. 5, FIGS. 7 and 8) in which the passage penetration portion 13 is closed such that the openable and closable scaffold 17 functions as the stage scaffold 16 and an open state (FIG. 9) in which the passage penetration portion 13 is open such that the operator can pass through the passage penetration portion 13. The openable and closable scaffold 17 is supported on the support frame 8 via the coupling mechanisms 52 (herein, hinges). When the openable and closable scaffold 17 swings around an axis along the path direction X via the coupling mechanisms 52, the openable and closable scaffold 17 changes its state (its posture) between the closed state and the open state. When the operator reaches the first upper level stage 12*a* through the passage penetration portion 13 from the first level stage 11 by use of the upper level ladder 3, for example, the operator changes the openable and closable scaffold 17 from the open state to the closed state. Hereby, since the passage penetration portion 13 is closed by the openable and closable scaffold 17, the operator can perform a maintenance operation in the first upper level stage 12*a* by use of the openable and closable scaffold 17. Further, when the openable and closable scaffold 17 is changed to the closed state, it is possible to avoid the operator from falling into the passage penetration portion 13 by mistake. Here, the openable and closable scaffold 17 in the closed state has a posture along the horizontal plane. It is preferable that the work stage 10 have no unevenness between the openable and closable scaffold 17 in the closed state, the first-side fixed scaffold 26, the inner fixed scaffold 28, the movable scaffold 24 in the first deployment posture T2, the auxiliary scaffold 25 in the second deployment posture U2, and the second-side fixed scaffold 27. In the example illustrated herein, two openable and closable scaffolds 17 are arranged in the path direction X on the upper level stage 12. It is also preferable that a support member for supporting the openable and closable scaffolds 17 in the closed state from below be provided in other members adjacent to the openable and closable scaffolds 17.

As illustrated in FIGS. 3, 4, 6, the first level ladder 2 as a ladder for the operator to reach the first level stage 11 from the floor face is disposed outwardly from the first level stage 11 as viewed vertically. As described above, the first level ladder 2 is provided outwardly from the first level stage 11 to block the first doorway 90 (FIG. 3). The operator can move from the floor face to the first level stage 11 by use of the first level ladder 2 provided to block the first doorway 90.

In the present embodiment, the first level ladder 2 is provided to be connected to the first-side fixed scaffold 26 of the first level stage 11. As illustrated in FIG. 4, the first doorway 90 is provided on the second side X2 in the path direction relative to the wall K as viewed in the path perpendicular direction Y. On this account, the first level ladder 2 is provided to be connected to a region on the second side X2 in the path direction relative to a central portion, in the path direction X, of the first-side fixed scaffold 26 of the first level stage 11. The first level ladder 2 is attachable to and detachable from the support frame 8 forming the first doorway 90.

As illustrated in FIG. 3 and FIGS. 6 to 8, the upper level ladder 3 as a ladder for the operator to reach the upper level stage 12 from the first level stage 11 is disposed at a position overlapping with the first level stage 11 as viewed vertically. In the present embodiment, the upper level ladder 3 is disposed at a position overlapping with the first-side fixed scaffold 26 of the first level stage 11 as viewed vertically. The upper level ladder 3 is attachable to and detachable from the plurality of work stages 10 and is also attachable to and detachable from the support frame 8.

Figure 10:
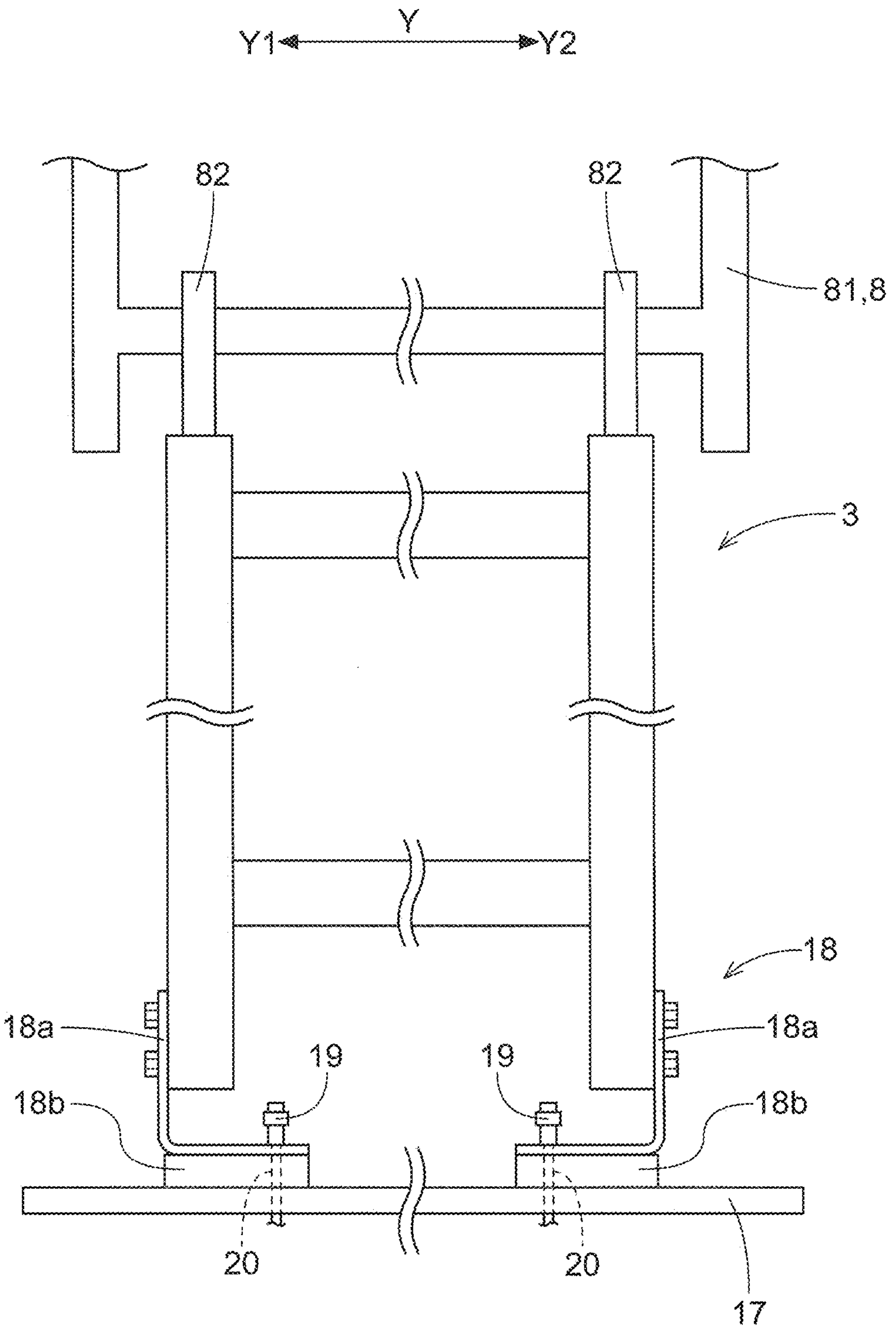
FIG. 10 is a front view illustrating a fixing section of an upper level ladder.

In the present example, the first level ladder 2 and the upper level ladder 3 have the same structure. On this account, the following describes the configuration of the upper level ladder 3 and does not describe the configuration of the first level ladder 2. As illustrated in FIG. 10, the upper level ladder 3 has an upper end to which an engageable section 82 having a hook shape is attached. These ladders each have a lower end to which a nonslip member 18*b* is attached via a link-up member 18*a*. The link-up member 18*a* is fixed to the lower end of the upper level ladder 3 and is also fixed to the upper surface of the nonslip member 18*b*. The nonslip member 18*b* and a portion of the link-up member 18*a* which portion abuts with the nonslip member 18*b* have an insertion hole 20 through which a fixing member 19 is passed. Herein, the fixing member 19 is a pin but may be a fastening bolt or the like. It is also preferable that the nonslip member 18*b* be an elastic member.

As illustrated in FIGS. 4, 6, when the engageable section 82 is engaged with the support frame 8 forming the first doorway 90, the first level ladder 2 is attached to a front surface (an outer side in the path perpendicular direction Y relative to the first doorway 90) of the first doorway 90. In the example illustrated herein, the nonslip member 18*b* abuts with the upper surface of an auxiliary frame 83 disposed along the path direction X with the engageable section 82 being engaged with the support frame 8. The wall K adjacent to the first side X1, in the path direction, of the first doorway 90 includes a first holding member 35. The first holding member 35 can hold the first level ladder 2. More specifically, when the engageable section 82 is engaged with a frame of the first holding member 35, the first level ladder 2 is held by the first holding member 35. Accordingly, in a case where the first level ladder 2 is not used, it is preferable that the first level ladder 2 be held by the first holding member 35.

As illustrated in FIGS. 6 to 9, the upper level ladder 3 is configured such that its lower portion is supported on the stage scaffold 16 other than the movable scaffold 24 in the work stage 10 where the upper level ladder 3 is disposed. As illustrated in FIG. 6, the lower portion of the upper level ladder 3 to reach the first upper level stage 12*a* from the first level stage 11 is supported on a region on the first side X1 in the path direction relative to the central portion, in the path direction X, of the first-side fixed scaffold 26 of the first level stage 11. As illustrated in FIGS. 7, 8, the lower portion of the upper level ladder 3 to reach the second upper level stage 12*b* from the first upper level stage 12*a* is supported on the openable and closable scaffold 17 in the closed state in the first upper level stage 12*a*. The upper level ladder 3 is provided on the openable and closable scaffold 17 in the closed state in the upper level stage 12. Thus, since the upper level ladder 3 is disposed on the stage scaffold 16 other than the movable scaffold 24, the operator can move up and down between the first upper level stage 12*a* and the second upper level stage 12*b* regardless of which posture the movable scaffold 24 has. In the present example, respective upper level ladders 3 provided in the plurality of work stages 10 (the first level stage 11, the upper level stage 12) are disposed at the same position on the work stages 10 such that the respective upper level ladders 3 overlap with each other as viewed vertically. In the present embodiment, as illustrated in FIG. 10, the maintenance facility 1 further includes a fixing section 18 for fixing the lower portion of the upper level ladder 3 to a portion of the stage scaffold 16 other than the movable scaffold. In the present example, the fixing section 18 is constituted by the link-up member 18*a* attached to the lower end of the upper level ladder 3, the nonslip member 18*b*, and the fixing member 19. The first-side fixed scaffold 26 of the first level stage 11 and the openable and closable scaffold 17 of the upper level stage 12 have respective through-holes (not illustrated) through which the fixing member 19 is passed through, at respective positions where respective upper level ladders 3 are attached.

As illustrated in FIG. 10, in an upper portion of the work stage 10, an engaged section 81 extending downward from the support frame 8 configured to support the stage scaffold 16 disposed one stage higher than the work stage 10 is provided. When the engageable section 82 is engaged with the engaged section 81, the upper level ladder 3 is disposed on the stage scaffold 16. Thus, the upper portion of the upper level ladder 3 is directly supported on the support frame 8. However, the upper level ladder 3 may be indirectly supported on the support frame 8 via the engaged section 81 such that the engaged section 81 is provided as an independent member from the support frame 8. When the engageable section 82 is engaged with the engaged section 81, the nonslip member 18*b* abuts with the attachment position on the first-side fixed scaffold 26 of the first level stage 11 or the openable and closable scaffold 17 of the upper level stage 12. When the fixing member 19 is passed through the insertion hole 20 and the through-hole (not illustrated), the lower portion of the upper level ladder 3 is fixed to the work stage 10. In a case where the upper level ladder 3 is not used, the upper level ladder 3 is held by a second holding member 36 provided in an end of the work stage 10 which end is on the first side Y1 in the path perpendicular direction, as illustrated in FIGS. 7 to 9. The second holding member 36 has the same structure as the first holding member 35. Hereby, the upper level ladder 3 not to be used can be stored at a position on the stage scaffold 16 at which position the upper level ladder 3 can hardly disturb the maintenance operation. Note that, in the example illustrated in FIG. 3, a support member 84 is fixed to an upper frame of the maintenance facility 1. The support member 84 overlaps with the passage penetration portion 13 as viewed vertically and is disposed above the uppermost work stage 10. A safety device such as a fall prevention wire, for example, can be attached to the support member 84.

The following description describes a case where the operator performs a maintenance operation in the second upper level stage 12*b*, as an example. Herein, the stacker crane 4 is disposed at the maintenance position 7.

In the present embodiment, as illustrated in FIG. 4, the operator moves to the first level stage 11 through the second doorway 93 by use of the first level ladder 2 attached to the support frame 8 of the first doorway 90. The operator fixes the upper level ladder 3 to the attachment position on the first-side fixed scaffold 26 and moves to the first upper level stage 12*a* by use of the upper level ladder 3. At this time, the operator passes through the passage penetration portion 13 of the first upper level stage 12*a* to move to the first-side fixed scaffold 26 of the first upper level stage 12*a*. The first-side fixed scaffold 26 of the upper level stage 12 is disposed adjacent to the second side X2, in the path direction, of the passage penetration portion 13 as described above. Then, the operator changes the openable and closable scaffold 17 from the open state to the closed state and fixes the upper level ladder 3 to the attachment position on the openable and closable scaffold 17. The operator moves to the second upper level stage 12*b* by use of the upper level ladder 3. At this time, the operator passes through the passage penetration portion 13 of the second upper level stage 12*b* to move to the first-side fixed scaffold 26 of the second upper level stage 12*b*. After that, the operator changes the openable and closable scaffold 17 from the open state to the closed state. Hereby, the operator can perform the maintenance operation by use of the openable and closable scaffold 17. Accordingly, even in a case where the passage penetration portion 13 is provided inside the upper level stage 12, it is possible to secure a wide scaffold for the operator to perform the maintenance operation. Here, as described above, the movable scaffold 24 in the first retracting posture T1 is disposed to overlap with the second-side fixed scaffold 27 as viewed vertically. Since the movable scaffold 24 in the first retracting posture T1 is disposed in a place that does not disturb the operator who moves on the first-side fixed scaffold 26 and the openable and closable scaffold 17 as such, it is possible to improve the working efficiency of the maintenance operation including the movement of the operator.

Subsequently, the operator on the first-side fixed scaffold 26 or the openable and closable scaffold 17 in the closed state changes the movable scaffold 24 from the first retracting posture T1 to the first deployment posture T2. Hereby, the operator can perform the maintenance operation by use of the movable scaffold 24 and the second-side fixed scaffold 27. Subsequently, the operator changes the auxiliary scaffolds 25 from the second retracting posture U1 to the second deployment posture U2. Hereby, the operator can perform the maintenance operation by use of the auxiliary scaffolds 25.

In a case where the operator performs the maintenance operation on the lifting and lowering body 44 or the transfer device 43 in the second upper level stage 12*b*, the operator moves the lifting and lowering body 44 to above the stage scaffold 16 of the second upper level stage 12*b* before the operator enters the maintenance facility 1. Accordingly, in a case where the operator performs the maintenance operation on the stacker crane 4, it is necessary to change the movable scaffold 24 and the auxiliary scaffold 25 to the retracting posture (the first retracting posture T1, the second retracting posture U1) in each work stage 10 before the stacker crane 4 is stored in the maintenance facility 1. In a case where the maintenance facility 1 is not used, it is preferable that the openable and closable scaffold 17 of the upper level stage 12 be in the open state.

Note that, in the present example, the coupling mechanisms 52 attached to the movable scaffold 24, the auxiliary scaffold 25, and the openable and closable scaffold 17 are hinges, but the coupling mechanisms 52 may be rectilinear guide mechanisms or the like.

OTHER EMBODIMENTS (1) The above embodiment has described, as an example, the configuration in which the maintenance facility 1 is adjacent to the storage shelf 5 and disposed in an end region of the travel path 6 for the stacker crane 4 which end region is on the first side X1 in the path direction. However, the present invention is not limited to such a configuration, and the maintenance facility 1 may be disposed at a position away from the storage shelf 5. Alternatively, the maintenance facility 1 may be disposed in the middle of the travel path 6 for the stacker crane 4. In this case, the stacker crane 4 may pass through the maintenance facility 1. In FIG. 1, a plurality of stacker cranes 4 may be disposed, and a plurality of maintenance facilities 1 may be disposed to correspond to the plurality of stacker cranes 4, respectively. For example, in a case where two stacker cranes 4 are disposed along one storage shelf 5, one maintenance facility 1 may be disposed on each outer side of the storage shelf 5 in the path direction X. Alternatively, in a case where one storage shelf 5 is disposed on each outer side of one maintenance facility 1 in the path direction X, one stacker crane 4 can be disposed along each storage shelf 5. In the example in FIG. 1, the inbound and outbound conveyor 94 is disposed on the second side X2 in the path direction relative to the storage shelf 5. However, the present invention is not limited to this, and a place where the inbound and outbound conveyor 94 is disposed can be modified appropriately. The number of maintenance facilities 1, stacker cranes 4, travel paths 6, or inbound and outbound conveyors 94 to be provided in the automated warehouse 100 or the arrangement thereof can be modified appropriately.

(2) The above embodiment has described, as an example, the configuration in which the upper level stage 12 includes the openable and closable scaffold 17 as part of the stage scaffold 16, the openable and closable scaffold 17 is supported on the support frame 8 via the coupling mechanisms 52, and the openable and closable scaffold 17 is changeable between the closed state and the open state by swinging via the coupling mechanisms 52, but the present invention is not limited to this. For example, the upper level stage 12 may not include the openable and closable scaffold 17. Even in a case where the upper level stage 12 includes the openable and closable scaffold 17, the openable and closable scaffold 17 is configured to be attachable to and detachable from the support frame 8, so that the openable and closable scaffold 17 can be brought into the closed state when the operator attaches the openable and closable scaffold 17 to the support frame 8. The openable and closable scaffold 17 may be configured to be supported on a member other than the support frame 8.

(3) The above embodiment has described, as an example, the configuration in which the stage scaffold 16 includes the auxiliary scaffold 25, but the present invention is not limited to this. The stage scaffold 16 may not necessarily include the auxiliary scaffold 25. Even in a case where the stage scaffold 16 includes the auxiliary scaffold 25, the auxiliary scaffold 25 may not be configured to be changeable between the second retracting posture U1 and the second deployment posture U2. In this case, for example, the auxiliary scaffold 25 can be attachable to and detachable from the work stage 10.

(4) The above embodiment has described, as an example, the configuration in which the upper level ladder 3 is attachable to and detachable from the plurality of work stages 10 and is also attachable to and detachable from the support frame 8, but the present invention is not limited to this. The upper level ladder 3 may be fixed to at least either of the plurality of work stages 10 and the support frame 8 so as not to be attachable thereto and detachable therefrom.

(5) The above embodiment has described, as an example, the configuration in which the auxiliary scaffold 25 is coupled with the inner fixed scaffold 28 of the fixed scaffold 22 via the coupling mechanisms 52, but the present invention is not limited to this. For example, the auxiliary scaffold 25 may be connected to the first-side fixed scaffold 26 or the second-side fixed scaffold 27 of the fixed scaffold 22 via the coupling mechanisms 52, and the auxiliary scaffold 25 in the second deployment posture U2 can be supported from both sides in the path direction X by the inner fixed scaffold 28 and the movable scaffold 24 (more specifically, the support section 23). Alternatively, the auxiliary scaffold 25 may be coupled with the support frame 8 via the coupling mechanisms 52. For example, in the example in FIGS. 5 to 9, in the configuration where the auxiliary scaffold 25 is coupled with the support frame 8 via the coupling mechanisms 52, the inner fixed scaffold 28 is also provided as the auxiliary scaffold 25. In this case, the support frame 8 can be further disposed to correspond to the inner fixed scaffold 28 on the second side X2 in the path direction.

(6) The above embodiment has described, as an example, the configuration in which the lower portion of the upper level ladder 3 used to reach the second upper level stage 12*b* from the first upper level stage 12*a* is supported on the openable and closable scaffold 17 in the closed state in the first upper level stage 12*a*, but the present invention is not limited to this. The lower portion of the upper level ladder 3 used to reach the second upper level stage 12*b* from the first upper level stage 12*a* may be supported on the fixed scaffold 22 adjacent to the openable and closable scaffold 17, for example.

(7) The above embodiment has described, as an example, the configuration in which the stacker crane 4 includes, as the mast 42, the first mast member 42*a* and the second mast member 42*b* disposed away from each other in a direction along the travel path 6, but the present invention is not limited to this. The stacker crane 4 can include only the first mast member 42*a* as the mast 42.

(8) The above embodiment has described, as an example, the configuration in which the maintenance facility 1 includes the fixing section 18 for fixing the lower portion of the upper level ladder 3 to a portion of the stage scaffold 16 other than the movable scaffold, but the present invention is not limited to this. The maintenance facility 1 may not include such a fixing section 18. In this case, for example, the lower portion of the upper level ladder 3 may not be fixed to the stage scaffold 16.

(9) The above embodiment has described, as an example, the configuration in which the movable scaffold 24 swings around the swing axis P1 attached to the second-side fixed scaffold 27, but the present invention is not limited to this. The movable scaffold 24 may be provided to swing around a swing axis attached to the first-side fixed scaffold 26.

(10) The above embodiment has described, as an example, the configuration in which the maintenance facility 1 includes the biasing mechanism 9 configured to bias the movable scaffold 24 in the swing direction around the swing axis P1, but the present invention is not limited to this. The maintenance facility 1 may not necessarily include such a biasing mechanism 9.

(11) The above embodiment has described, as an example, the configuration in which the guide fences 61 are provided along the opposite edges of the movable scaffold 24 in the path direction X, and the guide fences 61 are each changeable between the guide posture V1 standing relative to the movable scaffold 24 and the folding posture V2 along the movable scaffold 24, but the present invention is not limited to this. The guide fences 61 may be fixed to the movable scaffold 24 in the guide posture V1 without changing in posture as described above. Further, the movable scaffold 24 may not include the guide fences 61.

(12) Note that the configurations disclosed in the above embodiment can be applied in combination with the configurations disclosed in other embodiments (including combinations of the embodiments described as the other embodiments) as long as no inconsistency occurs. In terms of other configurations, the embodiment disclosed in the present specification is also just an example in all respects. Accordingly, various modifications can be made appropriately as far as it does not deviate from the scope of this disclosure.

OVERVIEW OF EMBODIMENTS

The following describes the overview of the automated warehouse described above.

An automated warehouse according to this disclosure is an automated warehouse including: a storage shelf configured to store a plurality of articles; a stacker crane configured to transport the articles; and a maintenance facility in which maintenance of the stacker crane is performed. The stacker crane includes: a travel wagon configured to travel along a travel path set along the storage shelf; a mast provided on the travel wagon in such a manner as to stand along an up-down direction; and a lifting and lowering body configured to support a transfer device for holding and transferring the articles and to lift and lower along the mast. The maintenance facility is disposed at a position not overlapping with the storage shelf as viewed vertically and being configured to store at least part of the stacker crane while the stacker crane is at a maintenance position set on the travel path. The maintenance facility includes a work stage disposed above the travel wagon. The work stage includes: a mast penetration portion through which the mast of the stacker crane at the maintenance position passes in the up-down direction; at least one stage scaffold provided in a region other than the mast penetration portion; and a support frame configured to support the at least one stage scaffold. The at least one stage scaffold includes at least one fixed scaffold fixed to the support frame, and a movable scaffold. The movable scaffold is changeable between a first retracting posture and a first deployment posture. The first retracting posture is a posture in which the movable scaffold does not come into contact with a path of the mast to move when the travel wagon travels along the travel path and which does not allow the movable scaffold to function as a scaffold for an operator. The first deployment posture is a posture in which the movable scaffold comes into contact with the path of the mast but does not come into contact with the mast of the stacker crane at the maintenance position and which allows the movable scaffold to function as the scaffold for the operator.

This configuration can prevent the maintenance facility from disturbing the movement of the stacker crane in a case where the stacker crane is moved along the travel path between the maintenance position and other positions. This makes it possible to appropriately store the stacker crane in the maintenance facility or take the stacker crane out of the maintenance facility.

With this configuration, when the movable scaffold is changed to the first deployment posture, it is possible to expand a range where the operator who performs the maintenance operation is movable and to provide the stage scaffold at a position near the mast of the stacker crane at the maintenance position. This allows the operator to easily perform the maintenance operation.

As such, with this configuration, it is possible to store the stacker crane appropriately and to allow the operator to easily perform the maintenance operation on the stacker crane.

Here, the s at least one stage scaffold further includes an auxiliary scaffold, and the auxiliary scaffold is changeable between a second retracting posture in which the auxiliary scaffold does not come into contact with a path of the lifting and lowering body to lift and lower when the stacker crane is at the maintenance position and which does not allow the auxiliary scaffold to function as the scaffold for the operator and a second deployment posture in which the auxiliary scaffold comes into contact with the path of the lifting and lowering body of the stacker crane at the maintenance position and which allows the auxiliary scaffold to function as the scaffold for the operator.

With this configuration, when the auxiliary scaffold is changed to the retracting posture, it is possible to prevent the maintenance facility from disturbing the lifting and lowering body when the lifting and lowering lifts or lowers. While the lifting and lowering body stops at a position where the lifting and lowering body does not come into contact with the work stage, it is possible to set the stage scaffold at a position near the mast of the stacker crane by changing the auxiliary scaffold to the second deployment posture. This allows the operator to easily perform the maintenance operation.

It is also preferable that: the auxiliary scaffold be coupled with the at least one fixed scaffold or the support frame via a coupling mechanism; and the movable scaffold include a support section configured to support, from below, a portion of the auxiliary scaffold which portion is different from a portion provided with the coupling mechanism.

With this configuration, it is possible to stably support the auxiliary scaffold by the fixed scaffold or the support frame and the movable scaffold.

It is also preferable that: the mast of the stacker crane include a first mast member and a second mast member that are disposed away from each other in a direction along the travel path; and the movable scaffold in the first deployment posture be disposed between the first mast member and the second mast member of the stacker crane at the maintenance position.

With this configuration, while the stacker crane is at the maintenance position, the stage scaffold can be set between the first mast member and the second mast member by changing the movable scaffold to the first deployment posture. This allows the operator to perform the maintenance operation between the first mast member and the second mast member, thereby allowing the operator to further easily perform the maintenance operation.

It is also preferable that: the at least one fixed scaffold include a first-side fixed scaffold disposed on one side relative to the path of the mast, and a second-side fixed scaffold disposed on the other side relative to the path of the mast; and the movable scaffold be configured to swing around a swing axis attached to the second-side fixed scaffold.

In this configuration, the movable scaffold swings around the swing axis attached to the second-side fixed scaffold different from the first-side fixed scaffold, so that the operator on the first-side fixed scaffold can change the movable scaffold between the first deployment posture and the first retracting posture. This allows the operator to easily and safely change the posture of the movable scaffold.

It is also preferable that the maintenance facility include a ladder for the operator to reach the work stage from a floor face which ladder is provided to be connected to the first-side fixed scaffold.

With this configuration, the operator can move to the first-side fixed scaffold of the work stage from the floor face by use of the ladder, so that the operator on the first-side fixed scaffold can change the posture of the movable scaffold.

It is also preferable that: the movable scaffold be configured to swing around a swing axis attached to the at least one fixed scaffold; the maintenance facility include a biasing mechanism configured to bias the movable scaffold in a swing direction around the swing axis; and the biasing mechanism bias the movable scaffold toward the first retracting posture such that a torque of the biasing mechanism is larger than a torque around the swing axis which torque is applied to the movable scaffold by self-weight of the movable scaffold when the movable scaffold is disposed closer to the first retracting posture than an intermediate posture, and the torque of the biasing mechanism is smaller than a torque around the swing axis which torque is applied to the movable scaffold by self-weight of the movable scaffold when the movable scaffold is disposed closer to the first deployment posture than the intermediate posture, the intermediate posture being at an intermediate position between the first retracting posture and the first deployment posture.

With this configuration, the movable scaffold is biased toward the first retracting posture when the movable scaffold is placed closer to the first retracting posture than the intermediate posture, and the movable scaffold is biased toward the first deployment posture when the movable scaffold is placed closer to the first deployment posture than the intermediate posture. This allows the operator to easily change the movable scaffold from the first retracting posture to the first deployment posture and to easily change the movable scaffold from the first deployment posture to the first retracting posture. In this configuration, in comparison with a case where no biasing mechanism is provided, it is possible to decrease a force required when the movable scaffold is changed from the first deployment posture to the first retracting posture and when the movable scaffold is changed from the first retracting posture to the first deployment posture, thereby making it possible to reduce a burden on the operator to change the posture of the movable scaffold. In the above configuration, when the movable scaffold is in the first retracting posture, the movable scaffold is maintained in the first deployment posture due to the self-weight of the movable scaffold, thereby making it possible to reduce the necessity to provide an additional mechanism such as a locking mechanism for holding the movable scaffold in the first deployment posture.

It is also preferable that: the at least one fixed scaffold include a first-side fixed scaffold disposed on one side in a path perpendicular direction across the path of the mast, and a second-side fixed scaffold disposed on the other side in the path perpendicular direction across the path of the mast, the path perpendicular direction being a direction perpendicular to a path direction as viewed vertically, the path direction being a direction along the travel path as viewed vertically; the movable scaffold in the first deployment posture be disposed over the first-side fixed scaffold and the second-side fixed scaffold; the movable scaffold include guide fences provided along opposite edges of the movable scaffold in the path direction; and the guide fences be changeable between a guide posture in which the guide fences stand from the movable scaffold and a folding posture in which the guide fences are folded to face the movable scaffold.

With this configuration, when the guide fences are in the guide posture on the movable scaffold in the first deployment posture, it is possible to reduce such a possibility that the operator who works on the movable scaffold loses his or her footing to outside the movable scaffold or a tool or the like put on the movable scaffold falls. In this configuration, when the guide fences are in the folding posture, it is possible to avoid the guide fences from coming into contact with the fixed scaffold or the like and disturbing posture change of the movable scaffold at the time when the movable scaffold is changed to the first retracting posture.

The automated warehouse according to this disclosure should be able to achieve at least one of the above effects.

What is claimed is:

1. An automated warehouse comprising:
a storage shelf configured to store a plurality of articles;
a stacker crane configured to transport the articles; and
a maintenance facility wherein maintenance of the stacker crane is performed, and
wherein:
the stacker crane comprises:
a travel wagon configured to travel along a travel path set along the storage shelf;
a mast provided on the travel wagon in such a manner as to stand along an up-down direction; and
a lifting and lowering body configured to support a transfer device for holding and transferring the articles and to lift and lower along the mast,
the maintenance facility is disposed at a position not overlapping with the storage shelf as viewed vertically and is configured to store at least part of the stacker crane while the stacker crane is at a maintenance position set on the travel path,
the maintenance facility comprises a work stage disposed above the travel wagon,
the work stage comprises:
a mast penetration portion through which the mast of the stacker crane at the maintenance position passes in the up-down direction;
at least one stage scaffold provided in a region other than the mast penetration portion; and
a support frame configured to support the at least one stage scaffold,
the at least one stage scaffold comprises at least one fixed scaffold fixed to the support frame, and a movable scaffold,
the movable scaffold is changeable between a first retracting posture and a first deployment posture,
the first retracting posture is a posture in which the movable scaffold does not come into contact with a path of the mast to move when the travel wagon travels along the travel path and which does not allow the movable scaffold to function as a scaffold for an operator,
the first deployment posture is a posture in which the movable scaffold comes into contact with the path of the mast but does not come into contact with the mast of the stacker crane at the maintenance position and which allows the movable scaffold to function as the scaffold for the operator.

2. The automated warehouse according to claim 1, wherein:

the at least one stage scaffold further comprises an auxiliary scaffold, and the auxiliary scaffold is changeable between a second retracting posture in which the auxiliary scaffold does not come into contact with a path of the lifting and lowering body to lift and lower when the stacker crane is at the maintenance position and which does not allow the auxiliary scaffold to function as the scaffold for the operator and a second deployment posture in which the auxiliary scaffold comes into contact with the path of the lifting and lowering body of the stacker crane at the maintenance position and which allows the auxiliary scaffold to function as the scaffold for the operator.

3. The automated warehouse according to claim 2, wherein:

the auxiliary scaffold is coupled with the at least one fixed scaffold or the support frame via a coupling mechanism, and the movable scaffold comprises a support section configured to support, from below, a portion of the auxiliary scaffold which portion is different from a portion provided with the coupling mechanism.

4. The automated warehouse according to claim 1, wherein:

the mast of the stacker crane comprises a first mast member and a second mast member that are disposed away from each other in a direction along the travel path, and the movable scaffold in the first deployment posture is disposed between the first mast member and the second mast member of the stacker crane at the maintenance position.

5. The automated warehouse according to claim 1, wherein:

the at least one fixed scaffold comprises a first-side fixed scaffold disposed on one side relative to the path of the mast, and a second-side fixed scaffold disposed on the other side relative to the path of the mast, and the movable scaffold is configured to swing around a swing axis attached to the second-side fixed scaffold.

6. The automated warehouse according to claim 5, wherein:

the maintenance facility comprises a ladder for the operator to reach the work stage from a floor face which ladder is provided to be connected to the first-side fixed scaffold.

7. The automated warehouse according to claim 1, wherein:

the movable scaffold is configured to swing around a swing axis attached to the at least one fixed scaffold, the maintenance facility comprises a biasing mechanism configured to bias the movable scaffold in a swing direction around the swing axis; and the biasing mechanism biases the movable scaffold toward the first retracting posture such that a torque of the biasing mechanism is larger than a torque around the swing axis which torque is applied to the movable scaffold by self-weight of the movable scaffold when the movable scaffold is disposed closer to the first retracting posture than an intermediate posture, and the torque of the biasing mechanism is smaller than a torque around the swing axis which torque is applied to the movable scaffold by self-weight of the movable scaffold when the movable scaffold is disposed closer to the first deployment posture than the intermediate posture, and the intermediate posture is at an intermediate position between the first retracting posture and the first deployment posture.

8. The automated warehouse according to claim 1, wherein:

the at least one fixed scaffold comprises a first-side fixed scaffold disposed on one side in a path perpendicular direction across the path of the mast, and a second-side fixed scaffold disposed on the other side in the path perpendicular direction across the path of the mast, the path perpendicular direction is a direction perpendicular to a path direction as viewed vertically, and the path direction is a direction along the travel path as viewed vertically, the movable scaffold in the first deployment posture is disposed over the first-side fixed scaffold and the second-side fixed scaffold, the movable scaffold comprises guide fences provided along opposite edges of the movable scaffold in the path direction, and the guide fences are changeable between a guide posture in which the guide fences stand from the movable scaffold and a folding posture in which the guide fences are folded to face the movable scaffold.

* * * * *